(12) United States Patent
Furuya et al.

(10) Patent No.: US 7,073,036 B2
(45) Date of Patent: Jul. 4, 2006

(54) BACKUP SYSTEM AND METHOD FOR TAPE RECORDING MEDIUM

(75) Inventors: Hodaka Furuya, Yokohama (JP); Hitoshi Arai, Yokohama (JP); Tomohiro Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 10/871,175

(22) Filed: Jun. 18, 2004

(65) Prior Publication Data

US 2005/0177767 A1    Aug. 11, 2005

(30) Foreign Application Priority Data

Dec. 25, 2003  (JP)  ............................. 2003-430159

(51) Int. Cl.
*G06F 12/00* (2006.01)

(52) U.S. Cl. .................. 711/162; 711/111; 711/152; 711/165; 711/4; 714/6; 707/204

(58) Field of Classification Search ............ None
See application file for complete search history.

(56) References Cited

U.S. PATENT DOCUMENTS 6,581,076 B1   6/2003  Ching et al.

2003/0177324 A1*  9/2003  Timpanaro-Perrotta ..... 711/162
2003/0196052 A1* 10/2003  Bolik et al. ................. 711/162

FOREIGN PATENT DOCUMENTS

JP        2002-297427        10/2002

OTHER PUBLICATIONS

"Storage Area Networks: Designing and Implemening a Mass Storage System." by Ralph H. Thornburgh, Barry J. Schoenborn. Pub. Sep. 12, 2000. Section 2.2.*

* cited by examiner

*Primary Examiner*—Mano Padmanabhan
*Assistant Examiner*—Kaushikkumar Patel
(74) *Attorney, Agent, or Firm*—Townsend and Townsend and Crew LLP

(57) ABSTRACT

On the basis of a priority table in which a plurality of group restoration priorities respectively corresponding to a plurality of element groups are recorded, the priority-based backup part backs up all of the backup object elements belonging to a first element group in a first continuous region which is a continuous recording region on a tape recording medium, and backs up all of the backup object elements belonging to a second element group whose group restoration priority is lower than that of said first element group in a second continuous region which is located on the tape tail end side of said first continuous region.

20 Claims, 18 Drawing Sheets

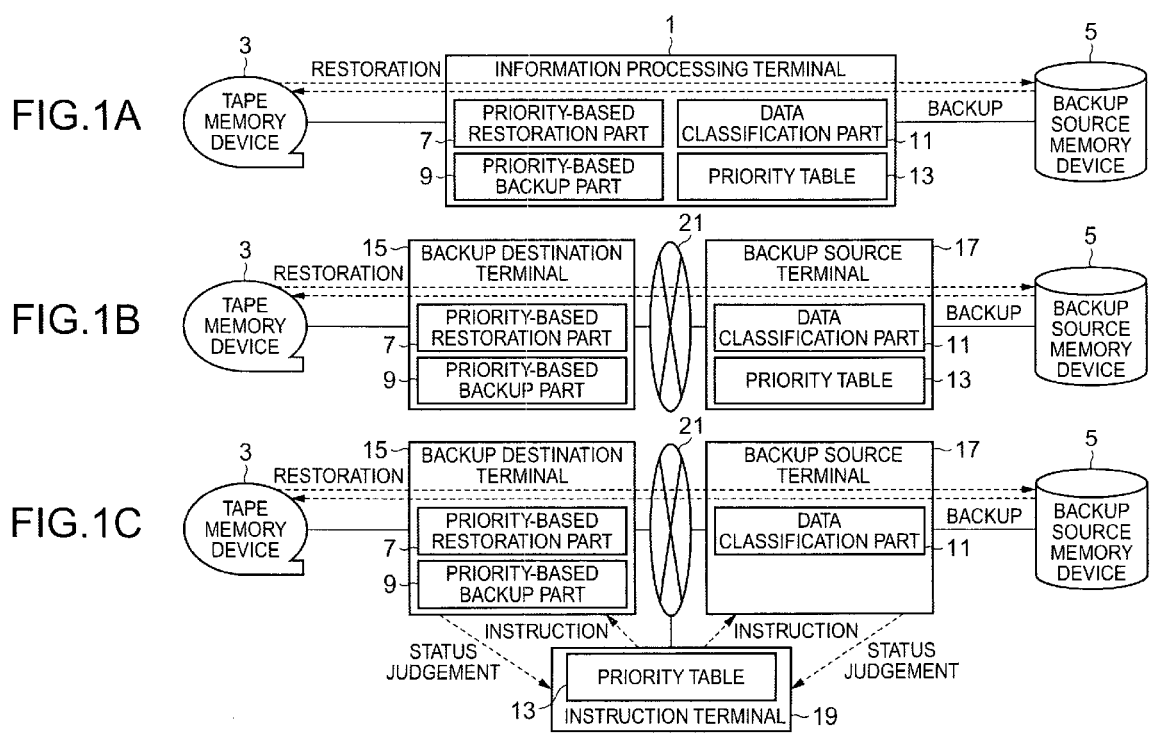

FIG.2A

| GROUP TYPE RANKING | ELEMENT GROUP TYPE |
|---|---|
| 1 | BUSINESS A DATA |
| 2 | BUSINESS B DATA |
| 3 | BUSINESS C DATA |
| ... | ... |
| 23 | BUSINESS W DATA |
| 24 | BUSINESS X DATA |
| 25 | OTHER |

FIG.2B

| RESTORATION TYPE RANKING | RESTORATION TIMING TYPE |
|---|---|
| 1 | HIGHEST PRIORITY (FOLLOWING REBOOTING OF SYSTEM) |
| 2 | NIGHTTIME BATCH |
| 3 | CASE WITH REQUEST FROM USER |

FIG.3

| GROUP RESTORATION PRIORITY | GROUP NAME | ELEMENT GROUP TYPE | RESTORATION TIMING |
|---|---|---|---|
| 1 | GROUP A | BUSINESS A DATA | FOLLOWING REBOOTING OF SYSTEM |
| 2 | GROUP B | BUSINESS B DATA | AFTER GROUP A |
| 3 | GROUP C | BUSINESS C DATA | AFTER GROUP B |
| ... | ... | ... | ... |
| 22 | GROUP V | BUSINESS V DATA | AFTER GROUP U |
| 23 | GROUP W | BUSINESS W DATA | NIGHTTIME BATCH |
| 24 | GROUP X | BUSINESS X DATA | NIGHTTIME BATCH, AFTER GROUP W |
| 25 | GROUP Y | OTHER 1 | NOT RESTORED (PERFORMED AT POINT IN TIME AT WHICH THERE IS A REQUEST FROM THE USER) |
| 26 | GROUP Z | OTHER 2 | NOT RESTORED (PERFORMED AT POINT IN TIME AT WHICH THERE IS A REQUEST FROM THE USER) |

FIG.4

| # | ELEMENT RESTORATION PRIORITY CONDITION | SUB-PRIORITY CONDITION | ELEMENT RESTORATION PRIORITY |
|---|---|---|---|
| 1 | FILE/DIRECTOR WITH NUMEROUS COMMON USERS | 10 OR MORE BUT FEWER THAN 20 PERSONS | 1 |
| | | 20 OR MORE BUT FEWER THAN 30 PERSONS | 2 |
| | | 30 PERSONS OR MORE | 3 |
| 2 | FILE JUDGED TO BE IMPORTANT FILE FROM EXPANDER OR KEY WORDS | .conf | 2 |
| | | .sys | 3 |
| 3 | FILE WITH LARGE NUMBER OF TIMES OF UPDATING AND/ OR HIGH REFERENCE FREQUENCY | TOTAL OF NUMBER OF TIMES OF UPDATING OR REFERENCE FREQUENCY 10 OR GREATER | 3 |
| 4 | FILE FOR WHICH ACL IS SET | | 4 |
| 5 | QUOTA INFORMATION | | 5 |

FIG.5

| # | GROUP NAME | ELEMENT RESTORATION PRIORITY | BACKUP OBJECT ELEMENT PATH |
|---|---|---|---|
| 1 | GROUP A | 5 | /mnt/usr1/ |
| 2 | GROUP A | 10 | /mnt/usr2/dir1/ |
| 3 | GROUP B | 5 | /mnt/usr2/dir2 |
| 4 | GROUP B | 3 | /mnt/usr3/dir1/file.txt |
| 5 | GROUP C | 1 | /mnt/data/ |
| 6 | GROUP B | 6 | /mnt/usr2/file.txt |
| 7 | GROUP D | 0 | /mnt/usr2/dir3/ |
| 8 | GROUP C | 0 | /mnt/usr3/dir1/file2.dat |
| ... | ... | ... | ... |
| 49 | GROUP Z | 0 | /mnt/etc/user.recyclebin |
| 50 | GROUP Y | 3 | /mnt/etc/recyclebin |

| # | GROUP NAME (NUMBER) | RANKING VALUE | FILE/DIRECTORY PATH |
|---|---|---|---|
| 1 | GROUP A | 10 | /mnt/usr2/dir1/ |
| 2 | GROUP A | 5 | /mnt/usr1/ |
| 3 | GROUP B | 6 | /mnt/usr2/file.txt |
| 4 | GROUP B | 5 | /mnt/usr2/dir2/ |
| 5 | GROUP B | 3 | /mnt/usr3/dir1/file.txt |
| 6 | GROUP C | 1 | /mnt/data/ |
| 7 | GROUP C | 0 | /mnt/usr3/dir1/file2.dat |
| 8 | GROUP D | 0 | /mnt/usr2/dir3/ |
| . . . | . . . | . . . | . . . |
| 49 | GROUP Y | 3 | /mnt/etc/recyclebin |
| 50 | GROUP Z | 0 | /mnt/etc/user/recyclebin |

| # | GROUP NAME | RANKING VALUE | FILE/DIRECTORY PATH | TAPE NUMBER |
|---|---|---|---|---|
| 1 | GROUP A | 10 | /mnt/usr2/dir1/ | 1 |
| 2 | GROUP A | 5 | /mnt/usr1/ | 1 |
| 3 | GROUP B | 6 | /mnt/usr2/file.txt | 1 |
| 4 | GROUP B | 5 | /mnt/usr2/dir2/ | 1 |
| 5 | GROUP B | 3 | /mnt/usr3/dir1/file.txt | 1 |
| 6 | GROUP C | 1 | /mnt/data/ | 1 |
| 7 | GROUP C | 0 | /mnt/usr3/dir1/file2.dat | 1 |
| 8 | GROUP D | 0 | /mnt/usr2/dir3/ | 1 |
| ... | ... | ... | ... | ... |
| 49 | GROUP Y | 3 | /mnt/etc/recyclebin | 2 |
| 50 | GROUP Z | 0 | /mnt/etc/user/recyclebin | 2 |

13

RESTORATION AND BACKUP OF ELEMENT GROUP WITH HIGHEST EDITING GROUP RESTORATION PRIORITY

RERESTORATION AND BACKUP OF ELEMENT GROUP WITH NEXT HIGHEST EDITING GROUP RESTORATION PRIORITY

COMPLETION OF EDITING BACKUP PROCESSING BY REPETITION OF FIG. 9 (B)

FIG.10A

FIRST TAPE | GROUP A | GROUP B | GROUP C | ... |

SECOND TAPE | ... | GROUP W | GROUP X | GROUP Y | GROUP Z | GROUP 1A | 1B | 1C |

GROUPA~GROUPZ : ELEMENT GROUPS
GROUP1A~GROUP1C : DIFFERENTIAL ELEMENT GROUPS

FIG.10B

FIRST TAPE | GROUP A | GROUP 1A | GROUP B | 1B | GROUP C | 1C | ... |

SECOND TAPE | ... | GROUP W | GROUP X | GROUP Y | GROUP Z |

FIG.10C

FIRST TAPE | A | GROUP 1A | GROUP B | 1B | GROUP C | 1C | ... |

SECOND TAPE | ... | GROUP W | GROUP X | GROUP Y | GROUP Z | ~40

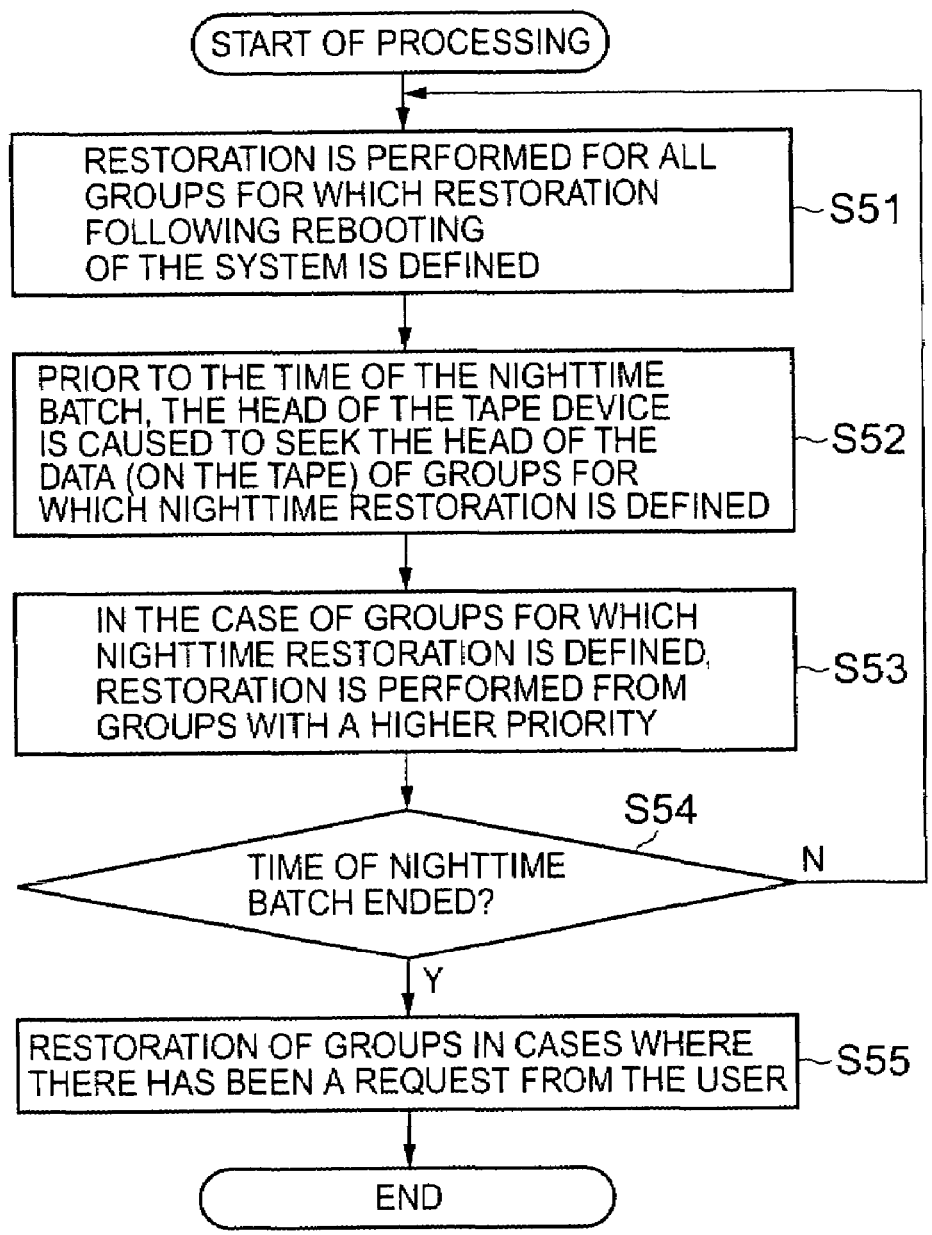

BACKUP SYSTEM AND METHOD FOR TAPE RECORDING MEDIUM

CROSS-REFERENCE TO PRIOR APPLICATION

This application relates to and claims priority from Japanese Patent Application Nos. 2004-42048, filed on Feb. 18, 2004 the entire disclosure of which are incorporated herein by reference.

BACKGROUND OF THE INVENTION

1. Field of the Invention

The present invention relates to a technique for backing up an object of backup on a tape recording medium.

2. Description of the Related Art

Techniques in which data that is the object of backup stored in magnetic disk memory devices such as disk array memory devices or the like is backed up on tape recording media possessed by tape memory devices such as magnetic tape libraries or the like are already known. For example, one technique of this type is a backup management device in which a backup schedule is prepared on the basis of the degree of importance of the data that is the object of backup, and this data that is the object of backup is backed up on a tape recording medium on the basis of the contents of this backup schedule (for example, see Japanese Patent Application Laid-Open No. 2002-297427 (especially paragraphs 51 through 53)).

In cases where data that is the object of backup is to be restored, backup data is read out from the tape recording medium. It is desirable from the standpoint of the user that the time required for such restoration be as short as possible.

SUMMARY OF THE INVENTION

It is an object of the present invention to record an object of backup on a tape recording medium so that the time required for the restoration of this object of backup can be minimized.

Other objects of the present invention will become clear from the following description.

The data backup system of the present invention is a system which is used to back up element groups that have one or more backup object elements on a tape recording medium; this system comprises priority-based backup means. On the basis of a plurality of group restoration priorities stored by group restoration priority memory means that store the plurality of group restoration priorities respectively corresponding to a plurality of element groups, the priority-based backup means back up all of the backup object elements that belong to a first element group in a first continuous region that is a continuous recording region (i. e., a single recording region) in the tape recording medium, and back up all of the backup object elements belonging to a second element group which has a lower group restoration priority than the abovementioned first element group in a second continuous region (e. g., a different single recording region) which is present on the tape trailing end side of the abovementioned first continuous region.

The system of the present invention can be realized by means of a computer system comprising a plurality of computer machines, or by means of a single computer machine.

The present invention makes it possible to record an object of backup on a tape recording medium so that the time required for the restoration of this object of backup can be minimized.

BRIEF DESCRIPTION OF THE DRAWINGS

FIGS. 1A–1C show an example of the construction of a backup system comprising a data backup device constituting one embodiment of the present invention;

FIGS. 2A–2B show an example of two different types of element group definition files prepared by the data classification part 11;

FIG. 3 shows an example of the group restoration timing table 33 prepared by the data classification part;

FIG. 4 shows one example of the element restoration priority definition table 34;

FIG. 5 shows one example of the priority table 13;

FIG. 6 shows one example of the priority table 13 following the sorting of a plurality of records;

FIG. 8 is a diagram showing one example of the priority table 13 to which tape recording medium identification information has been added;

FIGS. 10A–10C are diagrams which are used to illustrate editing backup processing using differential element groups;

FIG. 18 is a flow chart which shows the processing of restoration at the restoration timing described in the group restoration timing table 33.

DESCRIPTION OF THE PREFERRED EMBODIMENTS

Figure 7:
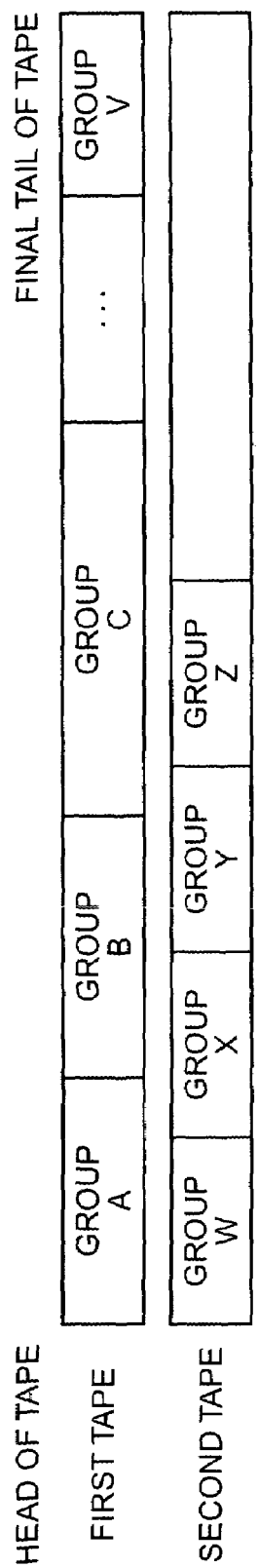
FIGS. 7A–7B are diagrams showing an image of the backup results on the tape recording medium.

An embodiment of the present invention will be described below with reference to the attached figures. Furthermore, in the following description, data files or directories that are the object of backup will be referred to as "backup object elements", groups that include one or more backup object elements will be referred to as "backup object element groups", and in cases where at least either backup object elements or backup object element groups are indicated, such entities will be referred to simply as the "object of backup".

FIG. 1 shows an example of the construction of a backup system comprising a data backup device constituting one embodiment of the present invention.

As is seen from FIG. 1(A) through FIG. 1(C), the backup system of the present embodiment comprises a backup source memory device 5, a tape memory device 3, a data classification part 11 comprising software, hardware or a combination of both, a priority-based backup part 9 and a priority-based restoration part 7.

For example, the backup source memory device 5 is a memory device which stores backup object element groups (hereafter referred to simply as "element groups") each containing one or a plurality of backup object elements. In concrete terms, for example, the backup source memory device 5 is a RAID (redundant array of independent inexpensive disks) memory device which comprises a plurality of hard disks that are arranged in the form of an array, and which stores element groups in logical memory regions (these memory regions are commonly called "logical units") disposed on the abovementioned plurality of hard disks.

The tape memory device 3 is a memory device which comprises one or a plurality of tape recording media (typically magnetic tapes), and which is the backup destination of the element groups (e. g., a magnetic tape library).

On the basis of given information, the data classification part 11 prepares a priority table 13 which describes the group restoration priority of each element group, and the element restoration priority of each backup object element contained in each element group, and accommodates this priority table 13 in an internal or external table storage medium (e. g., memory or hard disk; not shown in the figures) of the computer machine in which this data classification part 11 is installed.

The priority-based backup part 9 refers to the priority table accommodated in the table storage medium, selects element groups in descending order of the group restoration priority, selects backup object elements in descending order of the element restoration priority from the selected element groups, reads out the backup object elements in the order of selection, and writes these backup object elements into the tape memory device 3. As a result, on the tape recording medium of the tape memory device 3, element groups are lined up in descending order of the group restoration priority from the head of the tape to the tail of the tape, and within the tape memory regions in which the respective element groups are recorded, backup object elements are lined up in descending order of the element restoration priority from the side of the head of the tape toward the side of the tail of the tape. Furthermore, in the tape memory regions in which the respective element groups are recorded, only these element groups are continuously present; backup object elements belonging to other element groups are not present. In other words, in one or a plurality of tape recording media, the data recording regions of the respective element groups are single regions; the element groups are not recorded as dispersed element groups. Similarly, in the tape memory regions in which respective backup object elements are recorded, only these backup object elements are continuously present; no other backup object elements are present. In other words, in one or a plurality of tape recording media, the data recording regions of the respective backup object elements are single regions; the backup object elements are not recorded as dispersed elements.

At a specified timing or at a timing arbitrarily set by the user, the priority-based restoration part 7 successively reads out data while feeding the tape forward from a specified position of the tape recording medium toward the tail end of the tape recording medium, and accommodates the data that is read out in an internal or external restoration storage medium (e. g., memory or hard disk; not shown in the figures) of the computer machine in which this priority-based backup part 7 is installed. As a result, in the restoration storage medium, element groups are restored in descending order of the group restoration priority; in this case, the backup object elements contained in the respective element groups are restored in descending order of the element restoration priority.

For example, the abovementioned data classification part 11, priority-based backup part 9 and priority-based restoration part 7 may be installed in a single computer machine (this machine will be referred to below as an "information processing terminal") 1 as shown in FIG. 1(A). In this case, the information processing terminal 1 may be connected to the backup source memory device 5 and tap memory device 3, and may store the priority table 13 prepared by the data classification part 11, read out backup object elements from the backup source memory device 5 and back up these elements in the tape memory device 3, and read out backup object elements from the tape memory device 3 and back up these elements in the backup source memory device 5.

Furthermore, the abovementioned data classification part 11, priority-based backup part 9 and priority-based restoration part 7 may also be dispersed among a plurality of computer machines.

In concrete terms, as is shown for example in FIG. 1(B), the data classification part 11 may be installed in a first computer machine (this machine will be referred to below as the "backup source terminal") 17, and the priority-based backup part 9 and priority-based restoration part 7 may be installed in a second computer machine (this machine will be referred to below as the "backup destination terminal") 15. In this case, for example, the backup source terminal 17 and backup destination terminal 15 are connected via (for example) a communications network 21 (e. g., a fiber-channel storage area network (FC-SAN) or internet-protocol SAN (IP-SAN)). The backup source terminal 17 may be connected to the backup source memory device 5, and may store the priority table 13 prepared by the data classification part 11, read out backup object elements from the backup source memory device 5 and transmit these backup object elements to the backup destination terminal 15 in accordance with backup instructions from the backup destination terminal 15, and store backup object elements received from the backup destination terminal 15 or write object data that is produced in accordance with operations by the user in the backup source memory device 5. The backup destination terminal 15 may send backup instructions to the backup source terminal 17, write backup object elements received in response to these instructions into the tap memory device 3, an transmit backup object elements that are read out from the tape memory device 3 (data that is the object of restoration) to the backup source terminal 17.

Furthermore, for example, as is shown in FIG. 1(C), the priority table 13 that is prepared by the data classification part 11 of the backup source terminal 17 in the example shown in FIG. 1(B) may be transmitted to a third computer machine (this machine will be referred to below as the "instruction terminal") 19 from the backup source terminal 17 via the communications network 21, and may be store in a table storage medium installed in this instruction terminal 19. In this case, the instruction terminal 19 may transmit backup instruction commands and/or restoration instruction commands (hereafter referred to simply as "instruction commands") to the backup source terminal 17 and/or backup destination terminal 15. In cases where the backup source terminal 17 receives an instruction command from the instruction terminal 19, the backup source terminal 17 may send a backup instruction and/or an instruction for read-out of a backup object element for which restoration is desired to the backup destination terminal 15 in response to the abovementioned command. In response to an instruction command received from the instruction terminal 19, the backup destination terminal 15 may transmit the read-out order of the back-up object elements to the backup source terminal 17 on the basis of the priority table 13 in the instruction terminal 19, and may receive data in descending order of the group restoration priority and element restoration priority in response to this transmission, and/or may read out backup object elements from the tape memory device 3 and transmit these backup object elements to the backup source terminal 17. Following the transmission of instruction commands, the instruction terminal 19 may judge the backup processing status (e. g., the identity of the backup object elements and element groups for which backup has been completed) and/or the restoration processing status (e. g., the identity of the backup object elements and element groups for which restoration has been completed) in the backup source terminal 17 and/or backup destination terminal 15.

Thus, the abovementioned data classification part 11, priority-based backup part 9 and priority-based restoration part 7 can be installed in one or a plurality of computer machines (FIGS. 1(A) through 1(C) merely show an example; it goes without saying that the present invention need not be limited to the configuration shown in these figures, and may be installed in other configurations). Furthermore, the abovementioned computer machines 1, 15, 17 and 19 are personal computers or the like; in terms of hardware, for example, each of these computers comprises a CPU (central processing unit), volatile and/or nonvolatile memory (e. g., RAM, EEPROM or ROM), and storage medium such as a hard disk or the like (this will be referred to below as the "terminal storage medium"). Furthermore, in terms of software, each of the computer machines 1, 15, 17 and 19 comprises (for example) an OS (operating system) such as UNIX. Windows (registered trademark) or the like, and application programs which perform various types of processing on this OS. One or more of the data classification part 11, priority-based backup part 9 and priority-based restoration part 7 may be built into the OS, or may function as higher software of the OS. For example, in cases where the data classification part 11, priority-based backup part 9 and priority-based restoration part 7 are computer programs, if the CPU reads in a specified computer program (e. g., the data classification part 11) from the memory or hard disk, the computer machines 1, 15 and 17 function as information processing devices specific to the computer program (e. g., data classification part 11) that has been read in.

The content of the processing that is respectively performed by the data classification part 11, priority-based backup part 9 and priority-based restoration part 7 will be described in detail below.

First, the content of the processing that is performed by the data classification part 11 will be described.

As a first type of processing, the data classification part 11 performs processing that prepares two types of element group definition files on the basis of the restoration priority order.

FIG. 2 shows an example of the two types of element group definition files that are prepared by the data classification part 11.

As is shown in FIG. 2(A), a plurality of element group types, and group type rankings corresponding to the respective element group types, are recorded in the first element group definition file 31. For example, the element group types are recorded as "business A data", "business B data", . . . "other". Furthermore, the group type rankings are expressed by numbers, as 1, 2, . . . 25 (e. g., the lowest number indicates the highest type ranking).

Furthermore, as is shown in FIG. 2(B), two or more restoration timing types, and two or more restoration type rankings that respectively correspond to these two or more restoration timing types, are recorded in the second element group definition file 32. In concrete terms, for example, a restoration timing type of "highest priority (following rebooting of system)" is recorded as the type with the highest restoration type ranking (ranking "1"), a restoration timing type of "nighttime batch" is recorded as the type with the next highest restoration type ranking (ranking "2"), and a restoration timing type of "cases where there has been a request from the user" is recorded as the type with the lowest restoration type ranking (ranking "3").

The data classification part 11 prepares these first and second element group definition files 31 and 32 on the basis of information that is input by the user via a user interface (e. g., a keyboard). In other words, the first and second element group definition files 31 and 32 are prepared by the user. The first and second element group definition files 31 and 32 that have thus been prepared are stored in the internal or external definition file storage medium (e. g., memory or hard disk; not shown in the figures) of the computer machine in which this data classification part 11 is installed.

As a second type of processing, the data classification part 11 performs processing that prepares a group restoration timing table that describes a plurality of restoration timings respectively corresponding to a plurality of element groups.

FIG. 3 shows one example of the group restoration timing table 33 that is prepared by the data classification part 11.

A plurality of element group names, and group restoration priorities, element group types and restoration timings corresponding to the respective element group names, are recorded in the group restoration timing table 33. The group restoration priorities are expressed by numbers, e. g., 1, 2, . . . 26 (for example, the smallest number indicates the highest priority).

This restoration timing table 33 may be prepared by the user, or may be automatically prepared on the basis of the abovementioned two types of element group definition files 31 and 32 or the like.

The group type ranking ranges (one or a plurality of group type rankings) corresponding to the respective restoration timing types are set in the second element group definition file 32. Furthermore, a group information file (not shown in the figures) in which the respective element group names and corresponding element group types are recorded is stored in an internal or external group information file storage medium (e. g., memory or hard disk; not shown in the figures) of the computer machine in which the data classification part 11 is installed.

On the basis of the group information file and the first element group definition file, the data classification part 11 assigns a group list priority to each of the plurality of element groups. Here, in cases where two or more element groups that have the same element group type ranking exist, the data classification part 11 assigns a priority to these two or more element groups by a specified method (e. g., at random or in accordance with an element group ranking defined beforehand), and sets different group restoration priorities.

After group restoration priorities have thus been set for the respective element groups, the data classification part 11 sets the restoration timing for the respective element groups on the basis of the group restoration priorities, the group type rankings of the respective element groups, and the restoration timing types to which the group type ranking ranges correspond (i. e., the second element group definition file 32). Here, in cases where two or more element groups that have the same restoration timing type exist, a priority is assigned to these two or more element groups in accordance with the element group priority, and a different restoration timing is set. For example, in a case where "highest priority (following rebooting of system)" corresponds to the group names "group A" and "group B" as the same restoration timing type, the data classification part 11 sets the restoration timing for "group A" so that "group A" (which has a higher group restoration priority than "group B") is restored first, and sets the restoration timing for "group B" so that "group B" is restored following "group A".

The data classification part 11 can produce the group restoration timing table 33 by the method described above as an example. The table 33 that has thus been produced is stored in an internal or external timing table storage medium (e. g., memory or hard disk; not shown in the figures) of the computer machine in which the data classification part 11 is installed.

As a third type of processing, the data classification part 11 performs processing that assigns an element restoration priority to each of the one or more backup object elements within each element group on the basis of an element restoration priority definition table.

FIG. 4 shows one example of this element restoration priority definition table 34.

The element restoration priority definition table 34 is stored in an internal or external definition table storage medium (e. g., memory or hard disk; not shown in the figures) of the computer machine in which the data classification part 11 is installed. One or a plurality of element restoration priority conditions (e. g., attribute conditions of the backup object elements), and element restoration priorities that are assigned when these priority conditions are matched, are recorded in the element restoration priority definition table 34. Furthermore, for certain priority conditions, one or more sub-priority conditions and element restoration priorities that are assigned when the respective sub-priority conditions are matched are recorded.

As a first element restoration priority condition, there is a condition that relates to the number of common users of backup object elements; in concrete terms, for example, this is "file/directory with a large number of common users". For example, "10 or more but fewer than 20", "20 or more but fewer than 30" and "30 or more" exist as sub-priority conditions of this priority condition. In the example shown in the figure, "1" is assigned as the element restoration priority to files and/or directories for which the number of common users is 10 or more but fewer than 20. Furthermore, the element restoration priority differs from the group restoration priority in that a smaller number indicates a lower priority (i. e., in the example shown in the figure, "1" indicates the lowest element restoration priority, and "5" indicates the highest element restoration priority).

As a second element restoration priority condition, there is a condition that relates to file expanders or key words (file names or key words contained in the documents within the files); in concrete terms, for example, there is "file judged to be an important file from expanders or key words". Furthermore, for example, there are ".conf" and ".sys" as sub-priority conditions of this priority condition. In the example shown in the figure, "2" is assigned as the element restoration priority to files that have ".conf" as an expander.

As a third element restoration priority condition, there is a condition that relates to the number of times of updating and/or frequency of reference; in concrete terms, for example, there is "file with a large number of times of updating and/or high frequency of reference". For example, there is "file for which the number of times of updating or frequency of reference is 10 times or greater" as a sub-priority condition of this priority condition. Furthermore, the term "frequency of reference" used here refers to the number of times of reference in a given period (e. g., one week).

As fourth and fifth element restoration priority conditions, there are conditions that relate to types of information that are added to the backup object elements; in concrete terms, for example, there are "file for which ACL has been set" and "quota information". Furthermore, "ACL" is an abbreviation for "access control list", and refers to an access control list in which information indicating which users or user groups are authorized to access or amend files or the like is described. Furthermore, "quota information" refers to information that is used to place fixed limits on the utilization of disk storage (for example, information that expresses an upper limit on the number or size of files that can be used by a single user).

This element restoration priority definition table 34 may be appropriately edited (in terms of adding, deleting or updating information) by the user. For example, element restoration priority conditions and sub-priority conditions may be set so that the element restoration priority is set in greater detail. In concrete terms, for example, in cases where the backup object element is a directory, and a plurality of files are contained in this directory, the manner in which element restoration priorities are assigned to this directory may be recorded. More concretely, for example, if several (or more) files have the expander ".conf", it may be recorded that an element restoration priority of "2" is assigned to this directory. Furthermore, for example, in CIFS (common internet file system) sharing in samba, the degree of element restoration importance may be set in greater detail in accordance with the number of persons sharing the file/directory from smb.conf and smbpasswd as the priority condition of "file/directory for which the number of common users is large".

On the basis of this element restoration priority definition table 34, the data classification part 11 performs the third processing that assigns an element restoration priority to each of the one or more backup object elements within each element group, and stores the results of this third processing (i. e., the respective backup object elements and the element restoration priorities of these backup object elements) in a specified storage medium (e. g., memory such as a RAM or the like).

Subsequently, on the basis of the stored results of the third processing and the like, the data classification part 11 prepares a priority table 13 and stores this priority table 13 in a specified internal or external storage medium (e. g., memory or hard disk; not shown in the figures) of the computer machine in which the data classification part 11 is installed.

FIG. 5 shows one example of the priority table 13.

Paths to a plurality of backup object elements (files or directories), the element restoration priorities of these respective backup object elements and the names of the element groups that have these elements are recorded in the priority table 13. For example, this priority table 13 is prepared as follows.

Group element information (not shown in the figures) is recorded in a specified internal or external storage medium (e. g., memory or hard disk; not shown in the figures) of the computer machine in which the data classification part 11 is installed. This group element information is information in which a correspondence is established between the names of the respective element groups and the paths of the one or more backup object elements contained in these element groups.

The data classification part 11 prepares a priority table 13 in which the group names, element restoration priorities and backup object elements are all blank; then, referring to the abovementioned group element information, the data classification part 11 writes the paths of the backup object elements and the group names corresponding to these elements into the prepared priority table 13. Then, on the basis of the stored results of the third processing, the data classification part 11 writes the element restoration priorities corresponding to the respective backup object element paths into the priority table 13. As a result, the contents of the priority table 13 are the contents shown in FIG. 5.

Subsequently, as is shown in FIG. 6, the data classification part 11 sorts the plurality of records in the priority table 13 (groups of group names, element restoration priorities and backup object element paths) on the basis of the group restoration priorities stored in the group restoration timing table 33 and the element restoration priorities in the stored results of the third processing. In concrete terms, the data classification part 11 arranges the plurality of records in the priority table 13 in element group units, and sorts two or more record groups that have been arranged in element group units in descending order of the group restoration priority. Then, the data classification part 11 sorts the one or more records in the two or more record groups that have been arranged in element group units in descending order of the element restoration priority. As a result, the contents of the priority table 13 are the contents shown in FIG. 6.

The above has been a description of the content of the processing performed by the data classification part 11. Next, the content of the processing performed by the priority-based backup part 9 will be described.

The priority-based backup part 9 performs new backup processing which reads out element groups from the backup source memory device 5 and newly writes these groups into the tape recording medium, and editing backup processing which reads out element groups for which backup has been completed from the tape recording medium, temporarily restores these element groups, and then backs up these element groups on another tape recording medium.

For example, the following processing is performed in the new backup processing.

On the basis of the priority table 13 in which a plurality of records have been sorted (see FIG. 6), the priority-based backup part 9 reads out backup object elements from the backup source memory device 5 in descending order of the group restoration priority and the element restoration priority, and writes these backup object elements into a first data recording medium of the tape memory device 3 (in cases where the backup object elements are directories that have a plurality of files, the read-out and writing of the respective files are performed in a specified or arbitrary order). Furthermore, when backup object elements have been written to the final tail of the first tape recording medium, the priority-based backup part 9 selects a second tape recording medium inside the tape memory device 3, and writes the next backup object elements from the head of this second tape recording medium. In this case, for example, the priority-based backup part 9 may grasp the data size of the element groups and the data size that can be recorded on the tape recording medium, and may judge up to which group writing is performed on the first tape recording medium, and from which group writing is performed on the second tape recording medium, on the basis of these two grasped data sizes (furthermore, for example, the data size of the element groups may be grasped on the basis of the data size of the respective backup object elements contained in the respective element groups). As a result, the splitting of one element group so that this element group is written on two tape recording media is prevented.

Thus on the basis of the priority table 13, the priority-based backup part 9 gives precedence to the group restoration priority (between the group restoration priority and element restoration priority), and first selects the element group that has the highest group restoration priority. Next, the priority-based backup part 9 refers to the priority table 13, and selects backup object elements in descending order of the element restoration priority from the selected element group; then, in accordance with the paths of these backup object elements, the priority-based backup part 9 reads out the backup object elements from the backup source memory device 5, and writes these backup object elements onto the tape recording medium. This series of processing steps is performed for all of the element groups in descending order of the group restoration priority. Consequently, as is shown in FIG. 7(A), data is continuously recorded in element group units on the first tape recording medium and second tape recording medium (in other words, one element group is recorded only in one recording region on one of the tape recording media; there is no distributed recording of element groups in a plurality of recording regions). Furthermore, in the respective recording regions in which the respective element groups are recorded, as is shown in FIG. 7(B), the one or more backup object elements that are contained in the element groups are continuously recorded from the head end of the tape recording medium toward the final tail end of the tape recording medium in descending order of the element restoration priority (incidentally, FIG. 7(B) shows an example for an element group whose group name is "group B").

Furthermore, for each backup object element, as is shown in FIG. 8, the priority-based backup part 9 adds tape recording medium identification information (e. g., tape number) indicating the backup destination of the element in question to the priority table 13. As a result, it is possible to ascertain which backup object elements is recorded on which tape recording medium. In this case, although this is not particularly indicated in the figures, the priority-based backup part 9 may also record the readout starting position on the tape recording medium for each element group in addition to the tape recording medium identification information.

The above has been a description of the new backup processing. Next, the editing backup processing will be described. Furthermore, in cases where there are portions that overlap with the new backup processing, the description of such portions will be omitted or abbreviated.

Editing backup processing is performed in the following cases. For example, editing backup processing is performed in a first case in which one or more element groups are backed up by first new backup processing, and one or more other element groups are then backed up by second new backup processing on another tape recording medium, after which these one or more element groups and other element groups are summarized. Furthermore, for example, editing processing is performed in a second case in which the group restoration priorities of respective element groups and/or the element restoration priorities of backup object elements that have been backed up by new backup processing change as a result of various causes (e. g., alteration of element restoration priority conditions or the like). Editing backup processing will be described in detail below with reference to FIG. 9 using this second case as an example.

The group restoration timing table 33 for editing use (see FIG. 3) and the element restoration priority definition table 34 for editing use (see FIG. 4), which are used in editing backup processing, are prepared by the performance of the abovementioned first through third types of processing by the data classification part 11.

Figure 9A:
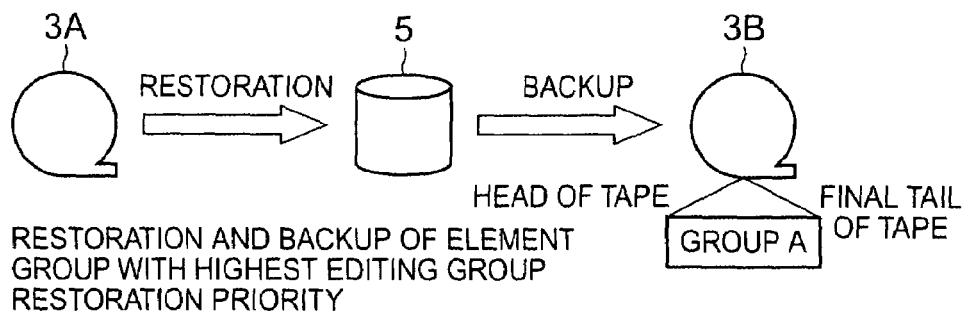
FIGS. 9A–9C are diagrams which are used to illustrate the editing backup processing.
Figure 9B:
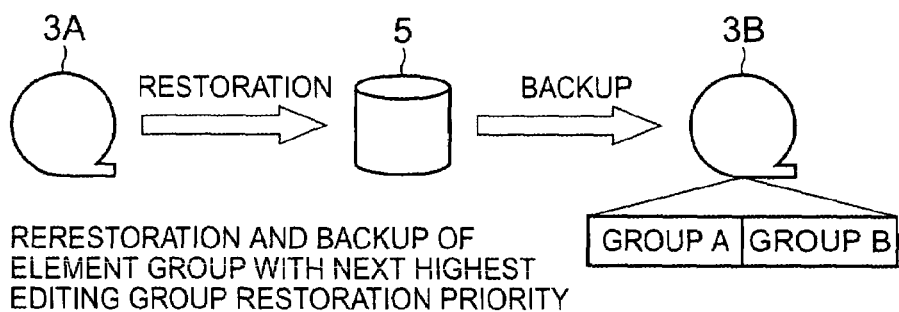
Figure 9C:
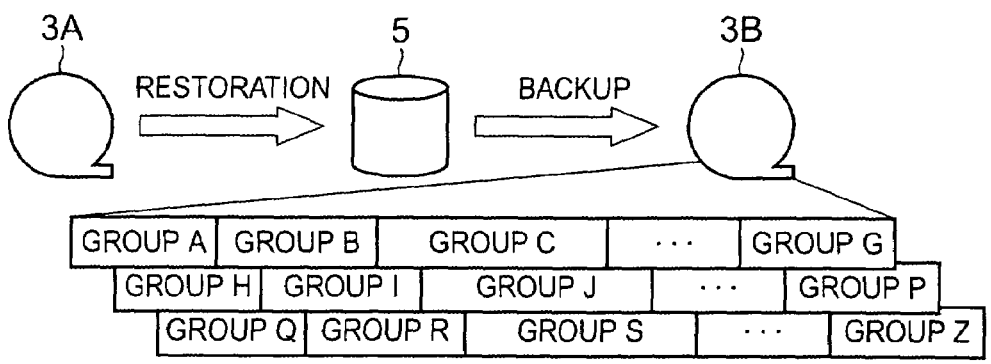

On the basis of the group restoration timing table 33 and element restoration priority definition table 34 for editing use, and the priority table 13 used in the previous backup processing (to which tape numbers have been added), as is shown in FIGS. 9(A) through 9(C), the priority-based backup part 9 feeds forward or rewinds the tape recording medium 3A as necessary, reads out the backup object elements from the tape recording medium 3A in descending order of the editing group restoration priority and the element restoration priority, and temporarily stores (i. e., restores) these backup object elements in the backup source memory device 5 (or on another recording medium). Furthermore, each time that a backup object element is restored, the priority-based backup part 9 backs up this backup object element on a separate tape recording medium 3B. As a result, a plurality of element groups are lined up in descending order of the group restoration priority, and backup object elements are lined up in descending order of the element restoration priority within the memory region of each element group, on the separate tape recording medium 3B which is the editing backup destination.

It would appear to be desirable to perform the above processing in cases where the total data size of the plurality of element groups that are restored is greater than the data size that can be stored on the restoration destination recording medium. In cases where the total data size o the plurality of element groups that are restored is equal to or less than the data size that can be recorded on the restoration destination recording medium, the priority-based backup part 9 may successively back up the respective backup object elements within the respective element groups on the separate tape recording medium 3B after all of the element groups have been restored.

Furthermore, in the case of editing backup processing, the priority-based backup part 9 may also back up only the differential element groups of the respective element groups as shown in FIG. 10.

Here, the term "differential element groups" refers to the differences between element groups that have been backed up during new backup processing (hereafter referred to as new element groups) and these element groups following editing (hereafter referred to as edited element groups) (i. e., the differences from element groups that have been backed up the first time), e. g., one or more backup object elements that have been newly added, or backup object elements that have been edited among the one or more backup object elements contained in new element groups.

In cases where such differential element groups are generated, for example, if the priority-based backup part 9 has completed new backup processing in a certain position in the second tape recording medium as shown in FIG. 10(A), the priority-based backup part 9 performs differential backup processing that backs up one or more differential element groups from this certain position toward the final tail end (in this case, the priority-based backup part 9 also performs backup for the one or more differential element groups in descending order of the group restoration priority and element restoration priority).

Subsequently, by performing the abovementioned editing backup processing, the priority-based backup part 9 continuously connects the element groups backed up by the new backup processing and the differential element groups of the same groups as these element groups, which have been backed up by the differential backup processing, in the backup destination recording medium used in this editing backup processing. As a result, in the backup destination recording medium used in the editing backup processing, the new element groups and the differential element groups of the same are continuously connected; accordingly, the restoration of element groups can be accomplished at a high speed without any wasteful forward feeding or rewinding of the tape.

Furthermore, portions that are duplicated in the new element groups and differential element groups of the same may be overwritten as shown in FIG. 10(C). In concrete terms, for example, the priority-based backup part 9 compares the paths of the respective backup object elements in element group A and the paths of the respective backup object elements in differential element group 1A, and if there are paths that match, the priority-based backup part 9 deletes the backup object elements in element group A for these paths, and instead records the backup object elements in differential element group 1A. As a result, an empty recordable region 40 is correspondingly generated, and the consumption of limited recordable regions on the tape can be suppressed.

The above has been a description of the content of the processing performed by the priority-based backup part 9. Next, the content of the processing performed by the priority-based restoration part 7 will be described.

The priority-based restoration part 7 reads out the group restoration timing table 33 stored in the abovementioned timing table storage medium (not shown in the figures), reads out element groups from the tape recording medium 4 on the basis of the restoration timing recorded in this table 33, and restores these element groups in the backup source memory device 5 (or in a separate memory device).

Figure 11:
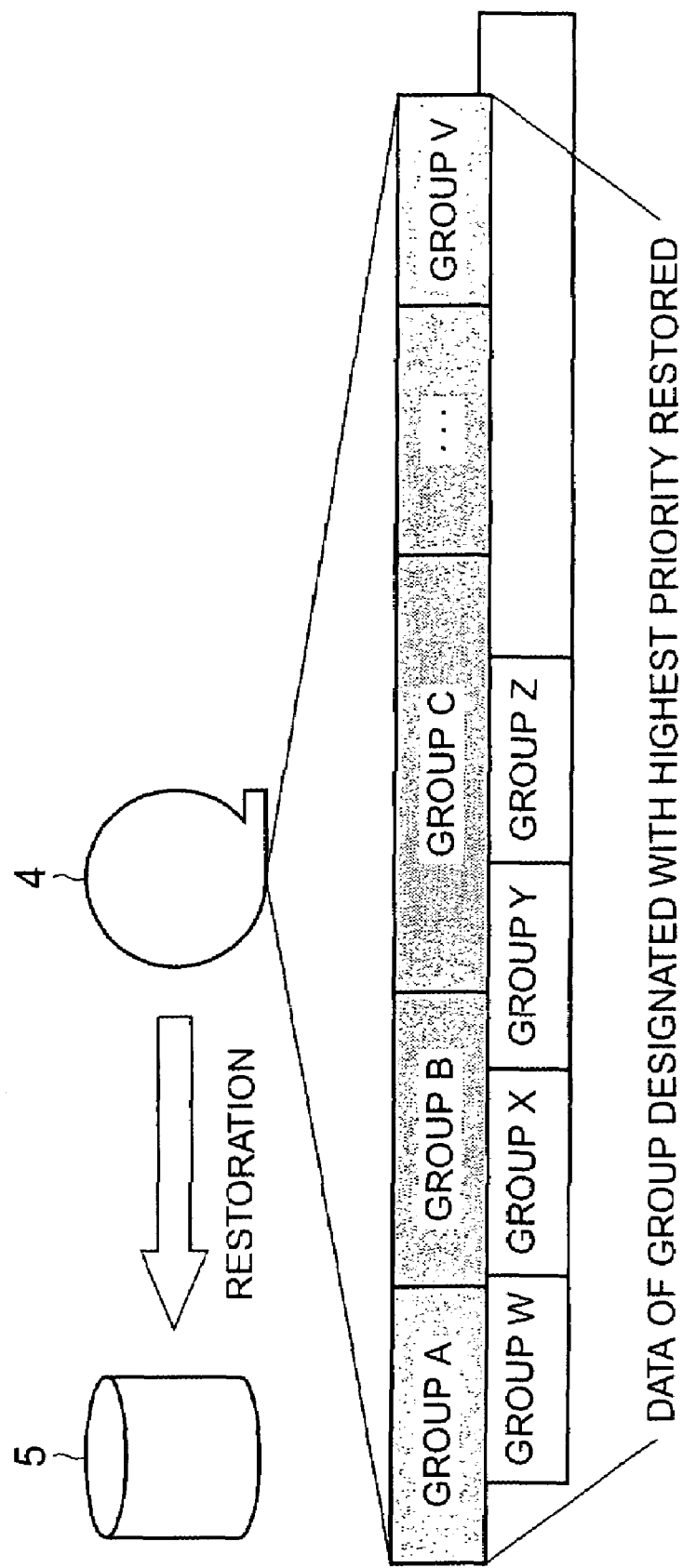
FIG. 11 is a diagram which is used to illustrate the processing that is performed in the case of the restoration of element groups in which the restoration timing type is "highest priority (following rebooting of the system)"

Here, to give a description using the timing table 33 shown in FIG. 3 as an example, in the case of the element groups A through V for which the restoration timing type is "highest priority (following rebooting of the system)" as shown in FIG. 11, the element groups are restored in the order of element groups A through V, which is descending order of group restoration priority, merely by successively reading out the data while feeding the tape forward from a specified position (e. g., the head position) on the tape recording medium 4 toward the final tail end following the rebooting of the system. In this case, in each element group, the backup object elements are restored in descending order of the element restoration priority.

Figure 12:
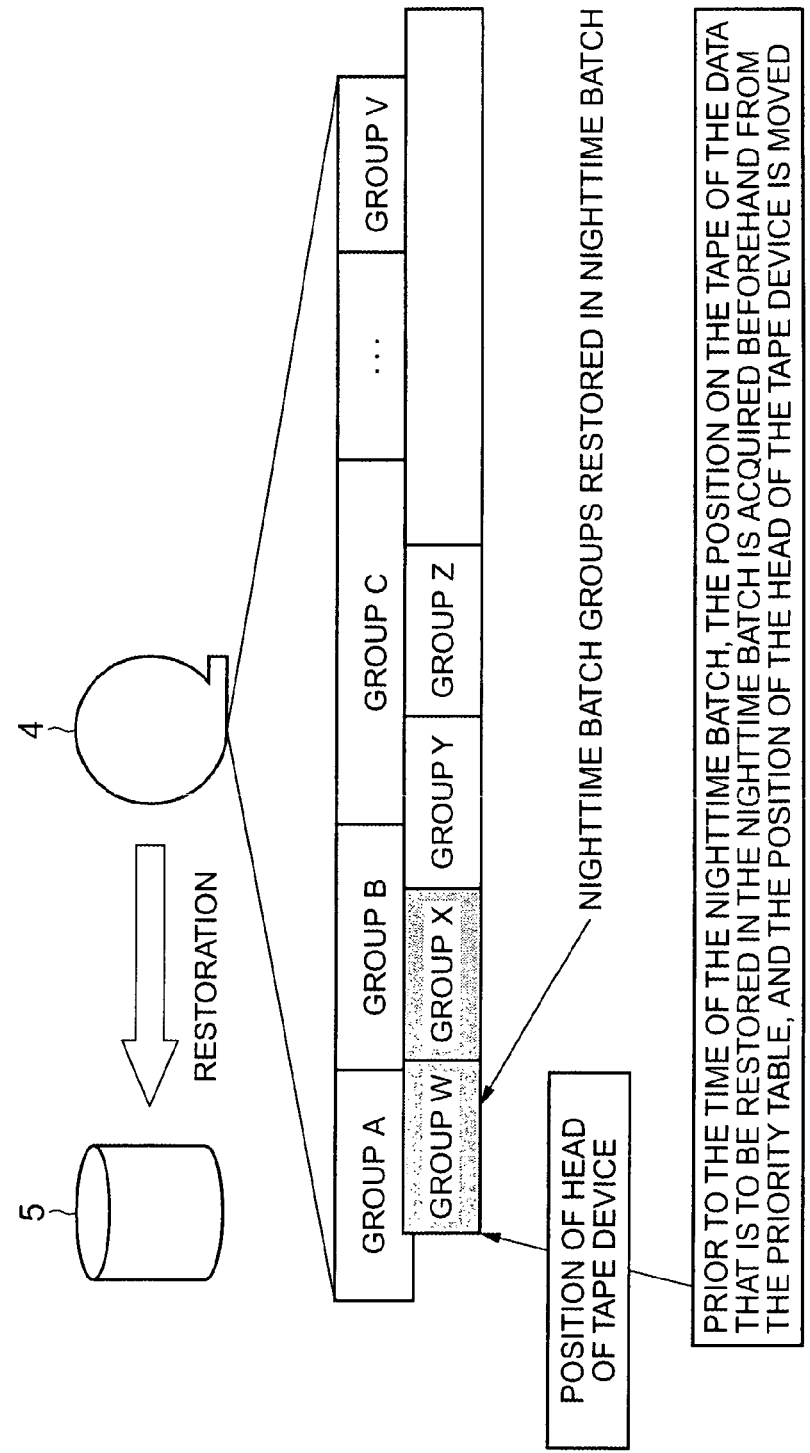
FIG. 12 is a diagram which is used to illustrate the processing that is performed in the case of the restoration of element groups in which the restoration timing type is "nighttime batch"

Furthermore, as in shown in FIG. 12, in the case of the element groups W through X, whose restoration timing type is "nighttime batch", the element groups are restored in the order of the element groups W through X, which is descending order of group restoration priority, merely by successively reading out the data while feeding the tape forward from a different position on the same tape recording medium 4 or a specified position on a separate tape recording medium 4, after the first instant of nighttime is reached (in this case, the priority-based restoration part 7 may refer to the respective read-out starting positions written in the priority table 13, and may move the position of the head of the tape memory device 3 to the read-out starting position of the element group W that is to be restored first during the nighttime, and cause the system to wait until the first instant of the nighttime is reached). Furthermore, in cases where the restoration of all of the element groups that are nighttime batch objects has not been completed by the time of the final instant of the nighttime, the priority-based restoration part 7 may temporarily end the restoration at the final instant of nighttime, and continue the restoration from the starting instant of the next nighttime period. Furthermore, in this case, in order to ensure that the restoration of a single element group is not split between the final instant of one nighttime period and the starting instant of the next nighttime period, the priority-based restoration part 7 may estimate whether or not the restoration of this element group can be completed by the final instant of the nighttime period on the basis of the data size of the element group and the length of time remaining from the current point in time to the final instant of the nighttime period before starting the restoration of this element group, and may end the nighttime batch restoration processing even though the final instant of the nighttime period has not yet been reached in cases where a negative estimation result is obtained.

Figure 13:
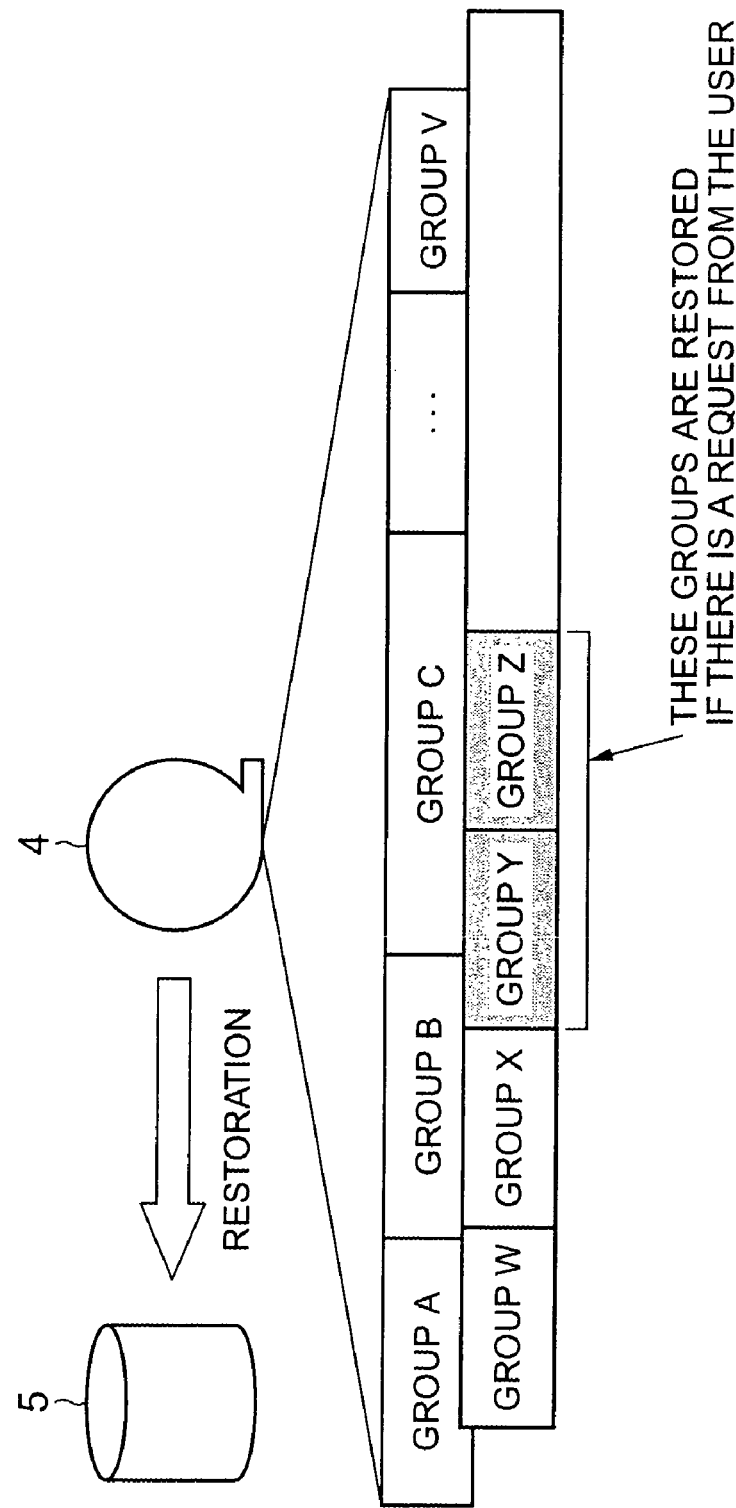
FIG. 13 is a diagram which is used to illustrate the processing that is performed in the case of the restoration of element groups in which the restoration timing type is "case in which there has been a request from the user"

Furthermore, as is shown in FIG. 13, for the element groups Y and Z whose restoration timing type is "case in which there has been a request from the user", the priority-based restoration part 7 does not automatically start restoration, but instead performs restoration of the element groups Y and Z in cases where there is a request from the user. In this case, the priority-based restoration part 7 may read out and restore only the element group Y or Z designated by the user, or may (in cases where a restoration command is simply received from the user) read out and restore all of the element groups Y through Z whose restoration timing type is "case in which there has been a request from the user".

The above has been a description of the priority-based restoration part 7.

Next, one example of the flow from the backup of element groups to the restoration of such groups will be described with reference to the flow charts shown in FIG. 14 and following figures.

Figure 14:
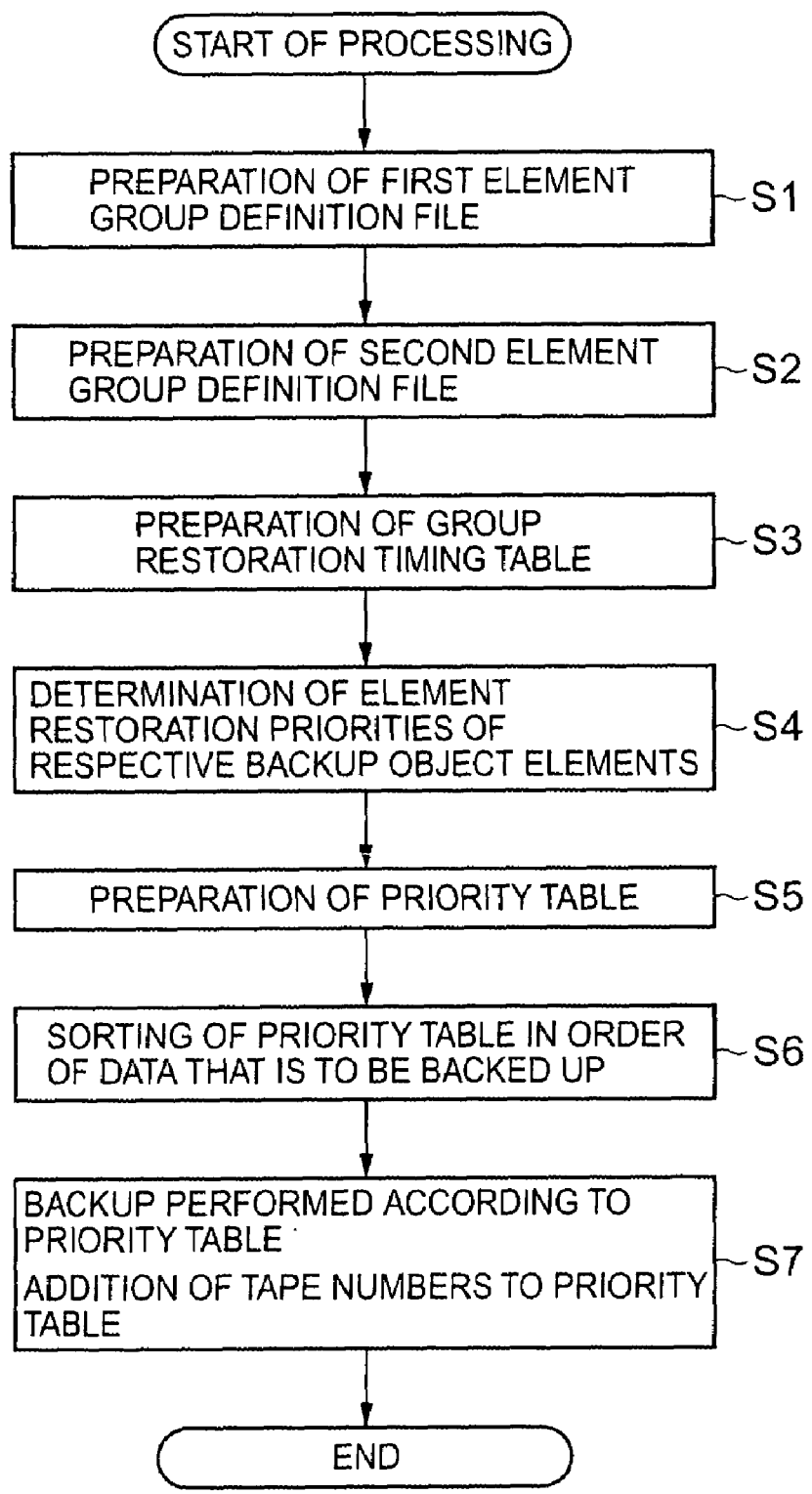
FIG. 14 shows a flow chart of the new backup processing.

FIG. 14 shows a flow chart of the new backup processing.

First, the data classification part 11 prepares a first element group definition file 31 (see FIG. 2(A)) in which a plurality of group type rankings respectively corresponding to a plurality of element group types are recorded in a specified storage medium (e. g., a memory such as a RAM or the like) (step S1).

Furthermore, the data classification part 11 prepares a second element group definition file 32 (see FIG. 2(B)) in which two or more restoration type rankings respectively corresponding to two or more restoration timing types are recorded in a specified storage medium (e. g., a memory such as a RAM or the like) (S2).

Next, on the basis of the first and second element group definition files 31 and 32, the data classification part 11 determines the restoration timings of the respective element groups, and prepares a group restoration timing table 33 (see FIG. 3) in which the respective restoration timings are recorded in a specified storage medium (e. g., a memory such as a RAM or the like) (S3).

Next, on the basis of the element restoration priority definition table 34 (see FIG. 4), the data classification part 11 performs processing that assigns an element restoration priority to each of the one or more backup object elements contained in each element group (S4), and stores the assignment processing results in a specified storage medium.

Subsequently, on the basis of the abovementioned stored assignment processing results and the like, the data classification part 11 prepares a priority table 13 (S5), and stores this priority table 13 in a specified storage medium (e. g., a memory or hard disk).

Then, the data classification part 11 sorts the plurality of records (groups of group names, element restoration priorities and backup object element paths) in the priority table 13 on the basis of the group restoration priorities recorded in the group restoration timing table 33 and the element restoration priorities in the stored third processing results, i. e., sorts these records in the order of backup (S6).

Subsequently, on the basis of the priority table 13 following the sorting of the plurality of records (see FIG. 6), the priority-based backup part 9 reads out backup object elements from the backup source memory device 5 in descending order of the group restoration priority and in descending order of the element restoration priority, and writes these backup object elements onto the tape recording medium. Furthermore, for each of the backup object elements, the priority-based backup part 9 adds the tape number of the backup destination of the element to the priority table 13 (S7).

When the processing of S7 is completed for all of the element groups, the new backup processing is ended.

Figure 15:
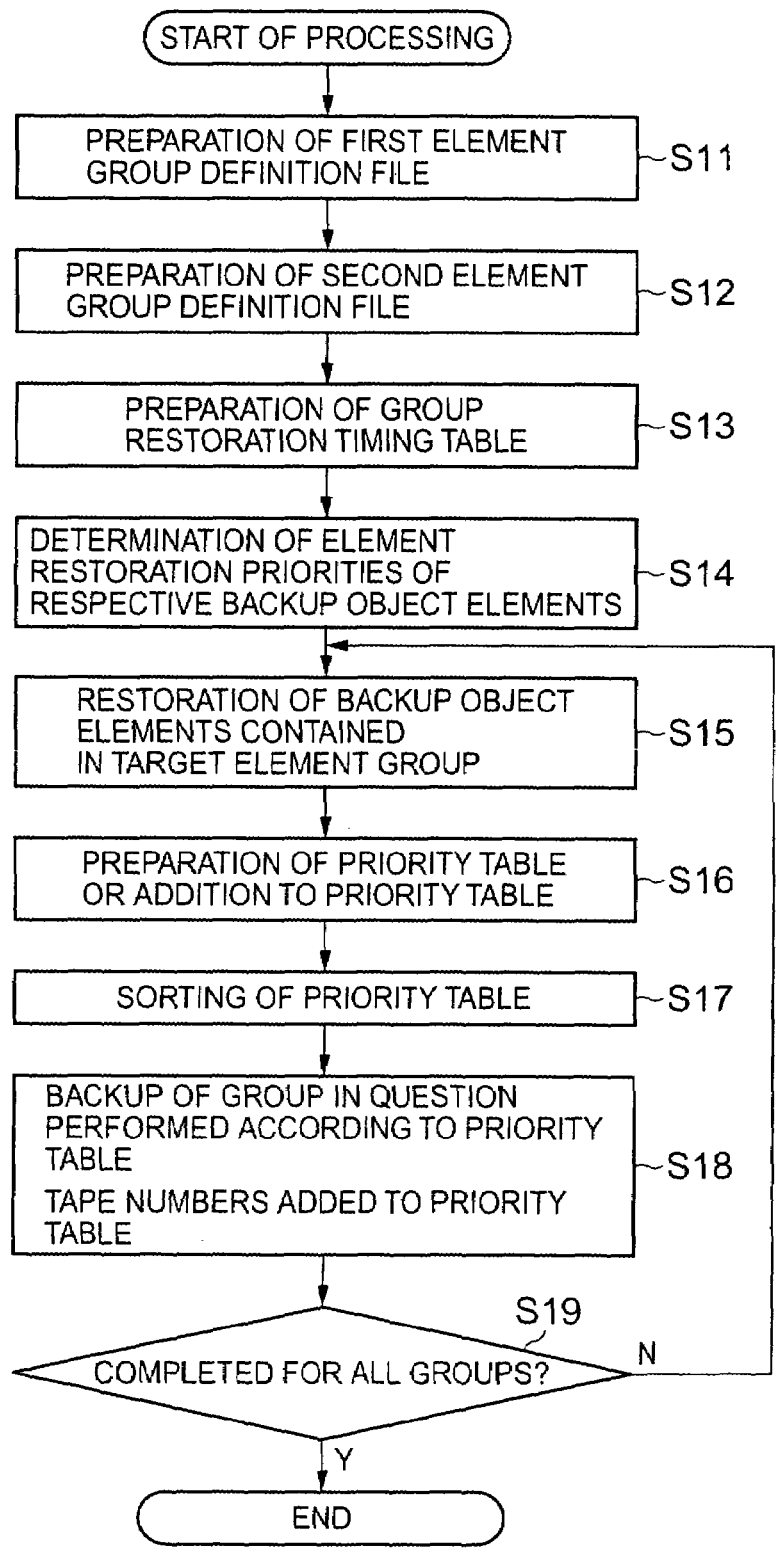
FIG. 15 shows a flow chart of the editing backup processing that is performed in cases where the total data size of the plurality of element groups that are restored is greater than the data size that can be stored in the recording medium that is the destination of restoration.

FIG. 15 shows a flow chart of the editing backup processing that is performed in cases where the total data size of the plurality of element groups that are to be restored is greater than the recordable data size of the restoration destination storage medium.

First, the data classification part 11 performs the processing of the abovementioned S1 through S4 (S11 through S14).

Next, for all of the element groups that are to be backed up by this editing backup processing, the priority-based backup part 9 performs the processing of the following S15 through S18 in descending order of the editing group restoration priority and element restoration priority.

Specifically, in S15, the priority-based backup part 9 reads out the one or more backup object elements contained in the target element group (when this S15 is performed for the first time, this is the group with the highest group restoration priority) from the backup source (e. g., tape recording medium) in descending order of the element restoration priority, and restores these backup object elements in a specified storage medium (memory or hard disk).

In this case, each time that a single backup object element (in the case of a directory, this is one file within the directory) is restored, or when all of the backup object elements within the target element group are restored, the priority-based backup part 9 prepares a new priority table 13, or records specified information (e. g., element paths or the like) in a priority table 13 that has already been prepared (S16). Subsequently, the priority-based backup part 9 sorts the one or more records in the priority table 13 in descending order of the editing group restoration priority and element restoration priority (S17).

Afterward, on the basis of the priority table 13 in which the records have been sorted, the priority-based backup part 9 reads out the backup object elements from the abovementioned specified storage medium that is the backup destination in descending order of the group restoration priority and in descending order of the element restoration priority, and writes these backup object elements onto the tape recording medium. Furthermore, for each backup object element, the priority-based backup part 9 adds the tape number of the backup destination of the element to the priority table 13 (S18).

The priority-based backup part 9 performs the processing of the abovementioned S15 through S18 for all of the element groups that are to be backed up by the editing backup processing (N in S19). Then, when this processing is completed (Y in S19), this editing backup processing is ended.

Figure 16:
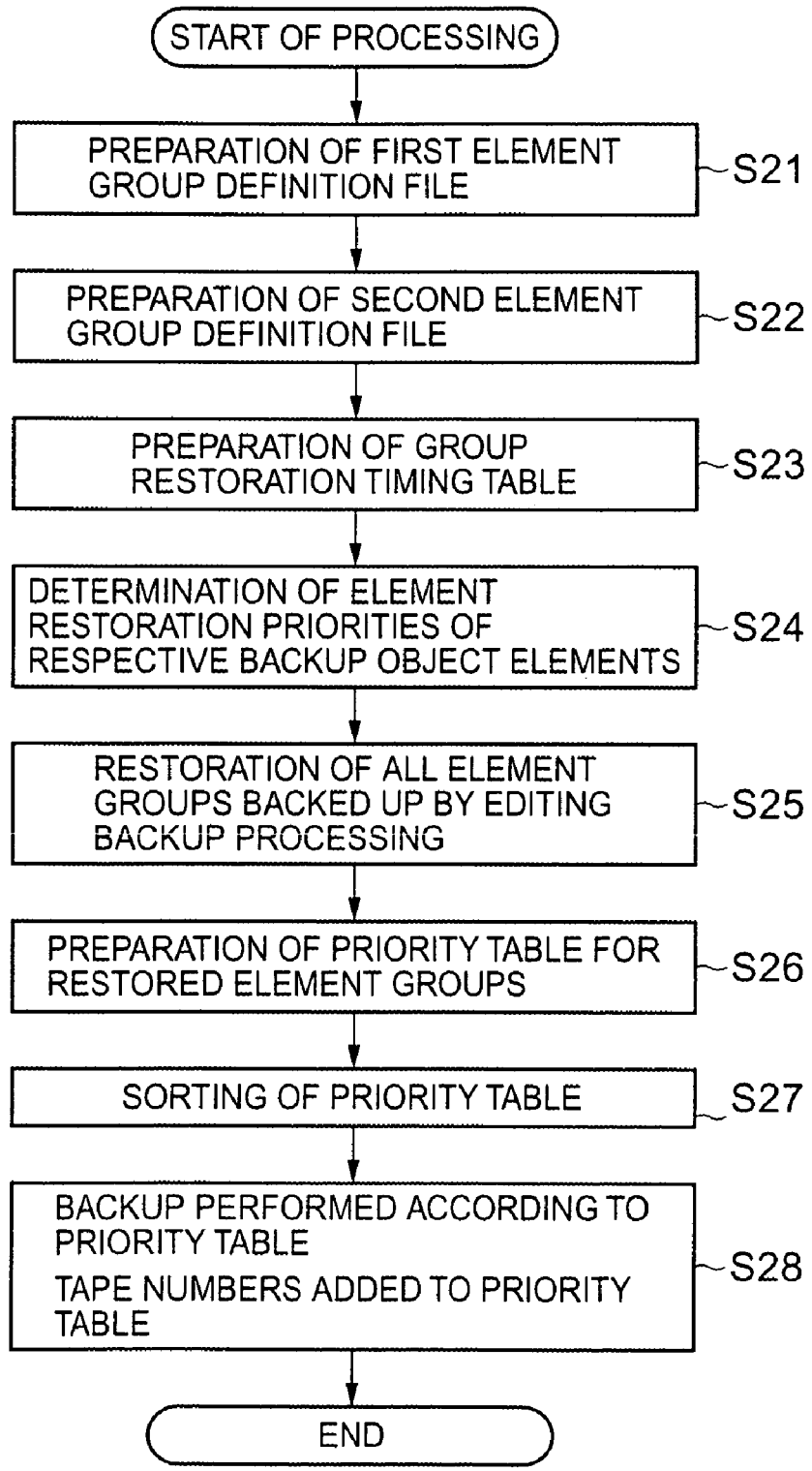
FIG. 16 shows a flow chart of the editing backup processing that is performed in cases where the total data size of the plurality of element groups that are restored is equal to or smaller than the data size that can be stored in the recording medium that is the destination of restoration.

FIG. 16 shows a flow chart of the editing backup processing that is performed in cases where the total data size of the plurality of element groups that are to be restored is equal to or less than the recordable data size of the storage medium that is the restoration destination.

First, the data classification part 11 performs the same processing as the abovementioned S1 through S4 (S21 through S24).

Next, the priority-based backup part 9 refers to the priority table 13 prepared in the new backup processing, reads out all of the element groups that are to be backed up by this editing backup processing from the backup source (e. g., tape recording medium), and restores these element groups in a specified storage medium (memory or hard disk) (S25).

Next, on the basis of the processing results of S21 through S24, the priority-based backup part 9 prepares an editing priority table 13 (S26), and sorts the plurality of records in this priority table 13 in descending order of the editing group restoration priority and element restoration priority (S27).

Subsequently, on the basis of the priority table 13 in which the records have been sorted, the priority-based backup part 9 reads out the backup object elements from the abovementioned specified storage medium that is the restoration destination in descending order of the editing group restoration priority and the element restoration priority, and writes these backup object elements onto the tape recording medium. Furthermore, for each backup object element, the priority-based backup part 9 adds the tape number of the backup destination of the element to the priority table 13 (S28).

When the processing of S28 is completed for all of the element groups, this editing backup processing is ended.

Figure 17:
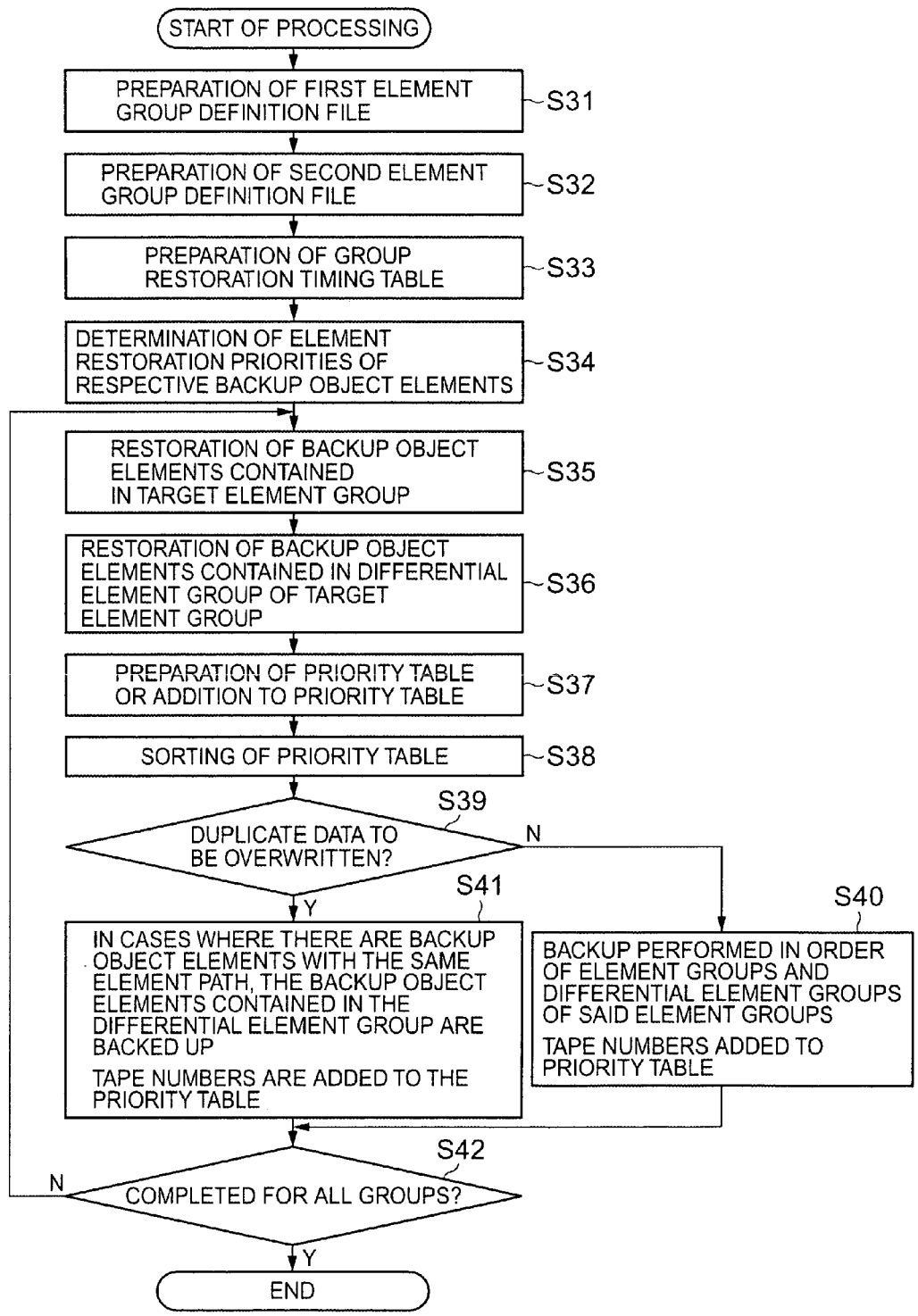
FIG. 17 is a flow chart of the editing backup processing of the differential element groups.

FIG. 17 shows a flow chart of the editing backup processing of differential element groups.

First, The data classification part 11 performs the same processing as the abovementioned S1 through S4 (S31 through S34).

Next, or all of the element groups that are to be backed up by this editing backup processing, the priority-based backup part 9 performs the processing of the following S35 through S41 in descending order of the editing group restoration priority and element restoration priority.

Specifically, in S35, the priority-based backup part 9 reads out the one or more backup object elements contained in the target element group (when this S35 is performed for the first time, this is the group with the highest group restoration priority) from the backup source (e. g., tape recording medium) in descending order of the element restoration priority, and restores these backup object elements in a specified storage medium (memory or hard disk).

Furthermore, in the same manner as in S35, the priority-based backup part 9 reads out the one or more backup object elements contained in the differential element groups of the element groups restored in S35 from the backup source (e. g., tape recording medium) in descending order of the element restoration priority, and restores the backup object elements in a specified storage medium (memory or hard disk) (S36).

In this case, each time that a single backup object element is restored, or when all of the backup object elements within an element group are restored, the priority-based backup part 9 prepares a new priority table 13, or records specified information (e. g., element paths or the like) in a priority table 13 that has already been prepared (S37). Subsequently, the priority-based backup part 9 sorts the one or more records in the priority table 13 in descending order of the editing group restoration priority and the element restoration priority (S38).

Next, the priority-based backup part 9 judges whether or not portions that are duplicated among the new element groups and differential element groups of the same are to be overwritten (S38). For example, this judgement is performed on the basis of the type of reply that is made in response to a query to the user regarding this overwriting, or on the basis of whether overwriting or not overwriting in the case of duplicate portions has been set beforehand.

In cases where it is judged in S38 that overwriting is not to be performed (N in S38), the priority-based backup part 9 performs backup on the tape recording medium in the order of the element groups and differential element groups of the same on the basis of the priority table 13 in which the records have been sorted. In this case, for the element groups and differential element groups, the priority-based backup part 9 writes the backup object elements onto the tape recording medium in descending order of the element restoration priority. Furthermore, for each backup object element, the priority-based backup part 9 adds the tape number of the backup destination of the element to the priority table 13 (S40).

On the other hand, in cases where it is judged in S38 that overwriting is to be performed (Y in S38), the priority-based backup part 9 backs up the backup object elements contained in the element groups and the differential element groups of the same in descending order of the element restoration priority on the basis of the priority table 13 in which the records have been sorted. In this case, the priority-based backup part 9 compares the paths of the respective backup object elements contained in the element groups and the paths of the respective backup object elements contained in the differential element groups of the same, and if there are paths that match, then the backup object elements contained in the differential element groups are backed up rather than the backup object elements contained in the element groups, in the case of the backup object elements that are obtained by following the abovementioned paths (i. e., in the case of the backup object elements that are duplicated). Furthermore, for each backup object element, the priority-based backup part 9 adds the tape number of the backup destination of the element to the priority table 13 (S41).

The priority-based backup part 9 performs the processing of the abovementioned S35 through S41 for all of the element groups and differential element groups that are to be backed up by the editing backup processing (N in S42). Then, if this processing is completed (Y in S42), this editing backup processing is ended.

FIG. 18 shows a low chart of the processing that performs restoration at the restoration timing described in the group restoration timing table 33.

For example, the priority-based restoration part 7 is started in cases where the computer machine in which this priority-based restoration part 7 is installed is rebooted (restarted), or in cases where the rebooting of other specified computer machines connected to this machine (e. g., the backup source terminal 17) is detected.

Furthermore, the priority-based restoration part 7 refers to the group restoration timing table 33, and if the names of element groups that are to be restored following the rebooting of the system are described, the priority-based restoration part 7 refers to the element paths, tape numbers or the like described in the priority table 13 or the elements contained in all of these element groups, reads out the backup object elements from a specified position of a specified tape recording medium 4, and restores these backup object elements in the backup source memory device 5 (or other memory device) (S51).

Next, for element groups whose restoration timing type is "nighttime batch", the priority-based restoration part 7 refers to the respective read-out starting positions that have been written into the priority table 13, moves the position of the head of the tape memory device 3 to the read-out starting position of the element group that is to be restored first in the nighttime, and causes the system to wait until the first instant of the nighttime period (S52).

Subsequently, when the first instant of the nighttime period is reached, the priority-based restoration part 7 successively reads out data while feeding the tape recording medium forward toward the final tail end of the tape from the position set in S52; i. e., the priority-based restoration part 7 reads out an restores the elements contained in the element groups that are the object of nighttime batch restoration in descending order of the group restoration priority and in descending order of the element restoration priority (S53). In this case, the priority-based restoration part 7 continues the processing of S53 as long as the final instant of the nighttime period is not reached (N in S54). On the other hand, if the final instant of the nighttime period is reached during the execution of S53 (Y in S54), the priority-based restoration part 7 temporarily ends this restoration, and then again performs S53 in the next nighttime batch processing.

Furthermore, in the case of element groups whose restoration timing type is "case in which there has been a request from the user", the priority-based restoration part 7 does not automatically start restoration, but instead restores the element groups in cases where there is a request from the user (S55).

Thus, in the abovementioned embodiment, a plurality of element groups are continuously backed up on the tape recording medium in descending order of the group restoration importance. As a result, element groups are restored in descending order of the group restoration importance merely by-reading out data while feeding the tape forward toward the final tail end of the tape from a specified position on the tape; accordingly, high-speed restoration can be accomplished without any need for wasteful rewinding or forward feeding of the tape recording medium.

Furthermore, in the abovementioned embodiment, the one or more backup object elements contained in each element group are continuously backed up in descending order of the element restoration importance. Consequently, the one or more backup object elements are backed up in descending order of the element restoration importance merely by reading out the data while successively feeding the tape forward toward the final tail end from a specified position on the tape, and the element groups are restored as a result; accordingly, efficient, high-speed restoration is possible.

In the abovementioned embodiment, several modifications such as those described below are possible.

For example, in a first modification, in addition to one or more backup object elements, one or more sets of parity data respectively corresponding to one or more backup-object files may be included in the element groups. In this case, the system may be devised so that when the backup object files are to be restored, only the parity data of the backup object files is read out in descending order of the element restoration priority. The option of whether to read out only the parity data, or whether to read out the backup object files, may be selected in accordance with instructions from the user. Furthermore, in cases where the data required for restoration is detected only as parity data, the restoration source (e. g., backup source terminal 17) may send instructions for the restoration of parity data only to the priority-based restoration part 7.

In a second modification, not only tape numbers, but also read-out starting position information relating to the read-out starting position (e. g., forward feeding time of the tape or motor revolutions) may be described for each set of backup object data in the priority table 13. Furthermore, this read-out starting position information may be written at the head of the tape. As a result, the instructed read-out starting positions of the backup object data can be specified by reading only the head of tape.

In a third modification, there may be sub-groups contained in the element groups, and the group restoration priority or element restoration priority may be further determined within the sub-groups.

In a fourth modification, the backup object elements may be split into a plurality of fragmented files, and the plurality of fragmented files may be respectively recorded in a dispersed manner on a plurality of tape recording media (e. g., backup may be accomplished by a RAID level 5 method). In this case, the data may be dispersed among a plurality of tape recording media, as long as data belonging to the same element group is not dispersed within a single tape recording medium.

In a fifth modification, the backup destination tape recording medium may be varied for each restoration timing type. Specifically, one or more first element groups that are restored on the basis of a first restoration timing type may be backed up on a first tape recording medium, and one or more second element groups that are restored on the basis of a second restoration timing type may be backed up on a second tape recording medium.

In a sixth modification, the number of restoration timing types may be greater than the three types described above. For example, in cases where the dropout of data is detected in a certain element group, processing that restores all of the element groups may be started immediately. In this case, since the element groups are present in only a single recording region (a single closed region) in the tape recording medium, high-speed restoration is possible.

In a seventh modification, the restoration timing types may be more detailed. For example, in the case of the restoration timing type of "following rebooting of the system", sub-timing types indicating that restoration is to be performed each time that the system (e. g., the backup source terminal 17 or backup destination terminal 15) is rebooted, or that restoration is to be performed when the system has been rebooted a certain number of times, may be set.

In an eighth modification, at least one of the computer machines 1, 15, 17 and 19 shown in FIG. 1 may be an NAS (network attached storage) head. Furthermore, the backup source device 5 may be an NAS head.

In a ninth modification, the tape recording medium of the tape memory device 3 may be a virtual tape. This virtual tape may comprise one or a plurality of portable recording media such as DVD, CD-R or the like. In this case, even if the object of backup is an object that straddles a plurality of portable recording media, restoration can be performed on the basis of group restoration priority and element restoration priority.

Furthermore, in this modification, the virtual tape may be formed on one or a plurality of hard disks or the like. Furthermore, after being recorded on the virtual tape, the object of backup may be recorded on a tape recording medium from this virtual tape, either in all cases or in specified cases (e. g., in cases where the group restoration priority is low).

In a tenth modification, the priority-based backup part 9 may back up only the incremental element groups of the respective element groups in the case of editing backup processing.

Here, the term "incremental element group" refers to the difference from the totality of the element group that was backed up up to the immediately preceding time (hereafter referred to as the "immediately preceding element group"). In concrete terms, for example, the incremental element group that is backed up the third time is the difference from the totality of the element group that is initially backed up and the element group that is backed up the second time.

For example, in cases where the priority-based backup part 9 backs up the incremental element group for the third time, the priority-based backup part 9 restores the initial element group and the element group of the second time, and continuously and successively records the initial element group (new element group), the incremental element group of the second time and the incremental element group of the third time in that order from the head end of the backup destination tape recording medium. As a result, even if (for example) the initial element group and the incremental element group of the second time are present on separate tapes, or are present in separated regions on the same tape, three element groups that have continuity are formed in a continuous region within the same tape by the editing backup processing that backs up the incremental element group of the third time.

An embodiment and modifications of the present invention were described above. However, these are merely examples used to illustrate the present invention; the scope of the present invention is not limited to the abovementioned embodiment and modifications alone. The present invention can be worked by various other modifications as well.

As one aspect of the present invention, the backup source device and backup destination device may be connected by a communications network such as a SAN or the like. A backup source memory device storing the first and second element groups may be connected to the backup source device. A tape memory device which has a tape recording medium may be connected to the backup destination device. In this case, the backup source device transmits the first and second element groups to the backup destination device, and the backup destination device transmits the received first and second element groups to the tape memory device, so that the first element group is backed up in the first continuous region of a certain tape recording medium, and the second element group (whose group restoration priority is lower than that of the first element group) is backed up in a second continuous region which is located on the tape tail end side of the first continuous region. Here, the first continuous region and second continuous region may be connected.

As one aspect of the present invention, in cases where one or more backup object elements respectively contained in the abovementioned first and second element groups are to be backed up, the abovementioned priority-based backup means refer to element restoration priority memory means that store one or more element restoration priorities respectively corresponding to the one or more backup object elements for each element group, and backs up the abovementioned one or more backup object elements that are to be backed up in the abovementioned first and second continuous regions in descending order of the abovementioned one or more stored element restoration priorities. Furthermore, in this case, as another aspect, element restoration priority calculation means may be provided. These calculation means refer to assignment information memory means that store element restoration priority assignment information in which attributes relating to the backup object elements are associated with point values, acquire one or a plurality of point values associated with one or more attributes of the backup object elements for each of the backup object elements, and calculate the element restoration priorities of the respective backup object elements on the basis of the abovementioned acquired one or plurality of point values.

As one aspect of the present invention, restoration timing setting means for setting a plurality of restoration timings respectively corresponding to the abovementioned plurality of element groups on the basis of group rankings respectively corresponding to the abovementioned plurality of element groups and one or more restoration timing types that are prepared beforehand may further be provided. These restoration timing setting means set for the abovementioned second element group the restoration timing that is later than that of the abovementioned first element group if the abovementioned second element group has a lower group ranking than the abovementioned first element group in cases where the same restoration timing type is set for the abovementioned first and second element groups (for example, if the group ranking of the second element group is the next highest group ranking following the group ranking of the first element group, a restoration timing that is next after that of the first element group may be set for the second element group).

As one aspect of the present invention, in cases where the memory contents of the abovementioned group restoration priority memory means have been updated, the abovementioned priority-based backup means read out and restore two or more element groups respectively corresponding to two or more group restoration priorities following updating from the abovementioned tape recording medium or a separate storage medium in descending order of the abovementioned two or more group restoration priorities, and back up the abovementioned two or more restored element groups on a separate tape recording medium in descending order of the abovementioned two or more group restoration priorities.

As one aspect of the present invention, in cases where an edited element group (e. g., a differential element group and/or incremental element group) of the abovementioned first element group is generated following the backup of the abovementioned first element group, the abovementioned priority-based backup means read out and restore the abovementioned first and second element groups from the abovementioned tape recording medium, back up the abovementioned restored first element group in a third continuous region of the abovementioned tape recording medium or a separate tape recording medium, back up the abovementioned edited element group in an additional fourth continuous region which is connected to the abovementioned third continuous region on the tape tail end side, and back up the abovementioned restored second element group in a fifth continuous region which is located on the tape tail end side of the abovementioned fourth continuous region. As a result, one element group is backed up in a single continuous region comprising the third continuous region and fourth continuous region.

As one aspect of the present invention, in cases where a differential element group of the abovementioned first element group is generated following the backup of the abovementioned first element group, the abovementioned priority-based backup means read out and restore the abovementioned first and second element groups from the abovementioned tape recording medium, back up a set comprising the abovementioned first element group and the abovementioned differential element group in which the duplicate portions of the abovementioned restored first element group and the abovementioned differential element group have been removed from the abovementioned first element group in a third continuous region of the abovementioned tape recording medium or a separate tape recording medium, and back up the abovementioned restored second element group in a fourth continuous region located on the tape tail end side of the abovementioned third continuous region.

As one aspect of the present invention, restoration means restoration means that restore element groups from the abovementioned tape recording medium in accordance with a plurality of restoration timings respectively associated with the abovementioned plurality of element groups may further be provided. These restoration means control the position of the read-out head of the abovementioned tape recording medium in advance in the case of restoration in a nighttime batch so that this position matches the position where read-out is started at the start of the abovementioned nighttime batch.

What is claimed is:

1. A backup system for backing up element groups that have one or more backup object elements on a tape recording medium, comprising priority-based backup means which back up all of the backup object elements belonging to a first element group in a first continuous region constituting a continuous recording region on the tape recording medium, and which back up all of the backup object elements belonging to a second element group whose group restoration priority is lower than the group restoration priority of said first element group in a second continuous region that is located on the tape tail end side of said first continuous region, on the basis of a plurality of group restoration priorities stored by group restoration priority memory means that store the plurality of group restoration priorities respectively corresponding to a plurality of element groups;

wherein in cases where an edited element group of said first element group is generated following the backup of said first element group, said priority-based backup means read out and restore said first and second element groups from said tape recording medium, back up said restored first element group in a third continuous region of said tape recording medium or a separate tape recording medium, back up said edited element group in an additional fourth continuous region which is connected to said third continuous region on the tape tail end side, and back up said restored second element group in a fifth continuous region which is located on the tape tail end side of said fourth continuous region.

2. The backup system according to claim 1, wherein in cases where one or more backup object elements contained in each of said first and second element groups are to be backed up, said priority-based backup means refer to element restoration priority memory means that store one or more element restoration priorities respectively corresponding to the one or more backup object elements according to each element group, and back up said one or more backup object elements that are to be backed up in said first and second continuous regions in descending order of said one or more stored element restoration priorities.

3. The backup system according to claim 2, further comprising element restoration priority calculation means which refer to assignment information memory means that store element restoration priority assignment information in which attributes relating to the backup object elements are associated with point values, acquire one or a plurality of point values associated with one or more attributes of the backup object elements for each of the backup object elements, and calculate the element restoration priorities of the respective backup object elements on the basis of said acquired one or plurality of point values.

4. The backup system according to claim 1, further comprising restoration timing setting means which set a plurality of restoration timings respectively corresponding to said plurality of element groups on the basis of group rankings respectively corresponding to said plurality of element groups and one or more restoration timing types that are prepared beforehand, wherein said restoration timing setting means set for said second element group the restoration timing that is later than the restoration timing of said first element group if said second element group has a lower group ranking than said first element group in cases where the same restoration timing type is set for said first and second element groups.

5. The backup system according to claim 1, wherein in cases where the memory contents of said group restoration priority memory means have been updated, said priority-based backup means read out and restore two or more element groups respectively corresponding to two or more group restoration priorities following updating from said tape recording medium or a separate storage medium in descending order of said two or more group restoration priorities, and back up said two or more restored element groups on a separate tape recording medium in descending order of said two or more group restoration priorities.

6. The backup system according to claim 1, wherein in cases where a differential element group of said first element group is generated following the backup of said first element group, said priority-based backup means read out and restore said first and second element groups from said tape recording medium, back up a set comprising said first element group and said differential element group in which the duplicate portions of said restored first element group and said differential element group have been removed from said first element group in a third continuous region of said tape recording medium or a separate tape recording medium, and back up said restored second element group in a fourth continuous region located on the tape tail end side of said third continuous region.

7. The backup system according to claim 1, which further comprises restoration means that restore element groups from said tape recording medium in accordance with a plurality of restoration timings respectively associated with said plurality of element groups, wherein said restoration means control the position of the read-out head of said tape recording medium in advance in the case of restoration in a nighttime batch so that the position matches the position where read-out is started at the start of said nighttime batch.

8. A backup method for backing up element groups that have one or more backup object elements on a tape recording medium, comprising the steps of:
   backing up all of the backup object elements belonging to a first element group in a first continuous region that is a continuous recording region on the tape recording medium on the basis of a plurality of group restoration priorities stored by a group restoration priority memory that stores the plurality of group restoration priorities respectively corresponding to a plurality of element groups;
   backing up all of the backup object elements belonging to a second element group whose group restoration priority is lower than the group restoration priority of said first element group in a second continuous region located on the tape tail end side of said first continuous region; and
   restoring element groups from said tape recording medium in accordance with a plurality of restoration timings respectively associated with said plurality of element groups, said restoring including controlling the position of the read-out head of said tape recording medium in advance in the case of restoration in a nighttime batch so that the position matches the position where read-out is started at the start of said nighttime batch.

9. A computer readable storage medium having a computer program for causing a computer to perform the steps of:
   referring to group restoration priority memory that store a plurality of group restoration priorities respectively corresponding to a plurality of element groups that have one or more backup object elements, and backing up all of the backup object elements belonging to a first element group in a first continuous region which is a continuous recording region on a tape recording medium on the basis of said plurality of group restoration priorities;
   backing up all of the backup object elements belonging to a second element group whose group restoration priority is lower than the group restoration priority of said first element group, in a second continuous region located on the tape tail end side of said first continuous region; and
   restoring element groups from said tape recording medium in accordance with a plurality of restoration timings respectively associated with said plurality of element groups, said restoring including controlling the position of the read-out head of said tape recording medium in advance in the case of restoration in a nighttime batch so that the position matches the position where read-out is started at the start of said nighttime batch.

10. A backup system for backing up element groups that have one or more backup object elements on a tape recording medium, comprising:
    priority-based backup means which back up all of the backup object elements belonging to a first element group in a first continuous region constituting a continuous recording region on the tape recording medium, and which back up all of the backup object elements belonging to a second element group whose group restoration priority is lower than the group restoration priority of said first element group in a second continuous region that is located on the tape tail end side of said first continuous region, on the basis of a plurality of group restoration priorities stored by group restoration priority memory means that store the plurality of group restoration priorities respectively corresponding to a plurality of element groups;
    wherein in cases where a differential element group of said first element group is generated following the backup of said first element group, said priority-based backup means read out and restore said first and second element groups from said tape recording medium, back up a set comprising said first element group and said differential element group in which the duplicate portions of said restored first element group and said differential element group have been removed from said first element group in a third continuous region of said tape recording medium or a separate tape recording medium, and back up said restored second element group in a fourth continuous region located on the tape tail end side of said third continuous region.

11. The backup system according to claim 10, wherein in cases where one or more backup object elements contained in each of said first and second element groups are to be backed up, said priority-based backup means refer to element restoration priority memory means that store one or more element restoration priorities respectively corresponding to the one or more backup object elements according to each element group, and back up said one or more backup object elements that are to be backed up in said first and second continuous regions in descending order of said one or more stored element restoration priorities.

12. The backup system according to claim 11, further comprising element restoration priority calculation means which refer to assignment information memory means that store element restoration priority assignment information in which attributes relating to the backup object elements are associated with point values, acquire one or a plurality of point values associated with one or more attributes of the backup object elements for each of the backup object elements, and calculate the element restoration priorities of the respective backup object elements on the basis of said acquired one or plurality of point values.

13. The backup system according to claim 10, further comprising restoration timing setting means which set a plurality of restoration timings respectively corresponding to said plurality of element groups on the basis of group rankings respectively corresponding to said plurality of element groups and one or more restoration timing types that are prepared beforehand, wherein said restoration timing setting means set for said second element group the restoration timing that is later than the restoration timing of said first element group if said second element group has a lower group ranking than said first element group in cases where the same restoration timing type is set for said first and second element groups.

14. The backup system according to claim 10, wherein in cases where the memory contents of said group restoration priority memory means have been updated, said priority-based backup means read out and restore two or more element groups respectively corresponding to two or more group restoration priorities following updating from said tape recording medium or a separate storage medium in descending order of said two or more group restoration priorities, and back up said two or more restored element groups on a separate tape recording medium in descending order of said two or more group restoration priorities.

15. The backup system according to claim 1, which further comprises restoration means that restore element groups from said tape recording medium in accordance with a plurality of restoration timings respectively associated with said plurality of element groups, wherein said restoration means control the position of the read-out head of said tape recording medium in advance in the case of restoration in a nighttime batch so that the position matches the position where read-out is started at the start of said nighttime batch.

16. A backup system for backing up element groups that have one or more backup object elements on a tape recording medium, comprising:
  priority-based backup means which back up all of the backup object elements belonging to a first element group in a first continuous region constituting a continuous recording region on the tape recording medium, and which back up all of the backup object elements belonging to a second element group whose group restoration priority is lower than the group restoration priority of said first element group in a second continuous region that is located on the tape tail end side of said first continuous region, on the basis of a plurality of group restoration priorities stored by group restoration priority memory means that store the plurality of group restoration priorities respectively corresponding to a plurality of element groups; and
  restoration means that restore element groups from said tape recording medium in accordance with a plurality of restoration timings respectively associated with said plurality of element groups, wherein said restoration means control the position of the read-out head of said tape recording medium in advance in the case of restoration in a nighttime batch so that the position matches the position where read-out is started at the start of said nighttime batch.

17. The backup system according to claim 16, wherein in cases where one or more backup object elements contained in each of said first and second element groups are to be backed up, said priority-based backup means refer to element restoration priority memory means that store one or more element restoration priorities respectively corresponding to the one or more backup object elements according to each element group, and back up said one or more backup object elements that are to be backed up in said first and second continuous regions in descending order of said one or more stored element restoration priorities.

18. The backup system according to claim 17, further comprising element restoration priority calculation means which refer to assignment information memory means that store element restoration priority assignment information in which attributes relating to the backup object elements are associated with point values, acquire one or a plurality of point values associated with one or more attributes of the backup object elements for each of the backup object elements, and calculate the element restoration priorities of the respective backup object elements on the basis of said acquired one or plurality of point values.

19. The backup system according to claim 16, further comprising restoration timing setting means which set a plurality of restoration timings respectively corresponding to said plurality of element groups on the basis of group rankings respectively corresponding to said plurality of element groups and one or more restoration timing types that are prepared beforehand, wherein said restoration timing setting means set for said second element group the restoration timing that is later than the restoration timing of said first element group if said second element group has a lower group ranking than said first element group in cases where the same restoration timing type is set for said first and second element groups.

20. The backup system according to claim 16, wherein in cases where the memory contents of said group restoration priority memory means have been updated, said priority-based backup means read out and restore two or more element groups respectively corresponding to two or more group restoration priorities following updating from said tape recording medium or a separate storage medium in descending order of said two or more group restoration priorities, and back up said two or more restored element groups on a separate tape recording medium in descending order of said two or more group restoration priorities.

* * * * *